(12) United States Patent
Grefen

(10) Patent No.: US 12,118,368 B2
(45) Date of Patent: *Oct. 15, 2024

(54) PROCESS CONTROL USING DIGITAL TWINS

(71) Applicant: ASCon Systems Holding GmbH, Stuttgart (DE)

(72) Inventor: Kilian Grefen, Schwieberdingen (DE)

(73) Assignee: ASCon Systems Holding GmbH, Stuttgart (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/510,539

(22) Filed: Nov. 15, 2023

(65) Prior Publication Data
US 2024/0086207 A1     Mar. 14, 2024

Related U.S. Application Data

(63) Continuation of application No. 17/882,074, filed on Aug. 5, 2022, now Pat. No. 11,875,160.

(51) Int. Cl.
G06F 9/448     (2018.01)

(52) U.S. Cl.
CPC .......... *G06F 9/4498* (2018.02); *G06F 9/4494* (2018.02)

(58) Field of Classification Search
CPC ..................................................... G06F 9/448
See application file for complete search history.

(56) References Cited

U.S. PATENT DOCUMENTS

| 8,291,428 B2* | 10/2012 | Richter ................. G06F 9/5038 718/104 |
| 11,562,112 B2 | 1/2023 | Grefen |
| 11,562,113 B2 | 1/2023 | Grefen |

(Continued)

FOREIGN PATENT DOCUMENTS

| EP | 19170105.1 | 10/2019 |
| EP | 19170106.9 | 10/2019 |
| EP | 3 726 305 A1 | 10/2020 |

OTHER PUBLICATIONS

Extended European Search Report for European Application No. 19170105.1 dated Oct. 14, 2019.

(Continued)

*Primary Examiner* — Jae U Jeon
(74) *Attorney, Agent, or Firm* — Wolf, Greenfield & Sacks, P.C.

(57) ABSTRACT

The present invention aims at providing an approach to digital twin-based process control for efficient and accurate achievement of process objectives. Heretofore, a controller service module (18) runs an event-driven control process in a digital twin domain for control of process entities operated in a process domain. The behavior of process entities is modeled through execution of state machine models. Event data is communicated asynchronously to the controller service module (18) for storage in a process cycle buffer (26). A model-based process controller (24) reads input information in processing cycles and controls process entities by operating state machine models to reflect the input of event data. It is checked whether the operation of state machine models triggers the generation of external control commands which are then output by an outbound interface (32) to process entities for control processing.

88 Claims, 31 Drawing Sheets

(56) References Cited

U.S. PATENT DOCUMENTS

| | | | |
|---|---|---|---|
| 11,875,160 | B1 | 1/2024 | Grefen |
| 2005/0078611 | A1 | 4/2005 | Adams et al. |
| 2010/0071010 | A1* | 3/2010 | Elnathan ............... H04N 5/06 725/81 |
| 2013/0204602 | A1 | 8/2013 | Kim et al. |
| 2015/0006122 | A1 | 1/2015 | Du |
| 2015/0349531 | A1* | 12/2015 | Vor Dem Esche ....... H02J 3/30 307/20 |
| 2016/0247129 | A1 | 8/2016 | Song et al. |
| 2018/0039249 | A1 | 2/2018 | Johnson et al. |
| 2020/0334401 | A1 | 10/2020 | Grefen |
| 2020/0334402 | A1 | 10/2020 | Grefen |
| 2022/0050759 | A1* | 2/2022 | McNeil, Jr. ........... G06F 11/076 |
| 2022/0058182 | A1* | 2/2022 | Lee .................... G06F 30/13 |
| 2022/0299492 | A1* | 9/2022 | Sawadogo ............... F24F 11/58 |

OTHER PUBLICATIONS

Extended European Search Report for European Application No. 19170106.9 dated Oct. 17, 2019.

De Lara et al., Domain-Specific Discrete Event Modeling and Simulating Using Graph Transformation. Software & Systems Modeling. Feb. 2014;13(1):209-28.

Graf et al., Dynamic Mapping of Runtime Information Models for Debugging Embedded Software. Proceedings of the Seventeenth IEEE International Workshop on Rapid System Prototyping (RSP '06). Jun. 14, 2006:3-9.

Huang et al., Digital Twin Modeling and Operating State Assessment of Substation Equipment. 2021 4th International Conference on Energy, Electrical and Power Engineering (CEEPE). Apr. 23, 2021:159-63.

Liu et al., Web-based digital twin modeling and remote control of cyber-physical production systems. Robotics and computer-integrated manufacturing. Aug. 1, 2020;64:101956.

Reichmann et al., Model Level Coupling of Heterogeneous Embedded Systems. In Proc. 2nd RTAS Workshop on Model-Driven Embedded Systems. May 2004:1-12.

Schroeder et al., Digital Twin Data Modeling With AutomationML and a Communication Methodology for Data Exchange. IFAC-PapersOnLine. Jan. 1, 2016;49(30):12-7.

Strelec et al., IIOT Device Prototype Design Using State Machine According to OPC UA. IEEE Access. Dec. 23, 2022;10:134004-17.

U.S. Appl. No. 18/086,052, filed Dec. 21, 2022, Grefen.

* cited by examiner

| Twin template (model) |
|---|
| Twin ID<br><br>Twin – Model reference<br><br>Twin - Identification |
| Custom fields<br>• Control logic<br>• State machine models<br>• Perspectives, initial states<br>• Propoerties<br>• Attributes<br>• Contexts<br>• Connectivity |

| Twin scheme (runtime) |
|---|
| Int value<br><br>PO Type<br><br>Identification context |
| Custom fields<br>• Control logic<br>• Perspectives<br>• Initial & actual states<br>• Contexts<br>• Parameters<br>• Connectivity |

| State scheme (runtime) |
|---|
| ID<br><br>Model reference & perspective<br><br>Twin ID<br><br>Twin ID model reference |
| Contexts<br><br>Payload |
| Connectivity 1:n |

FIG. 9

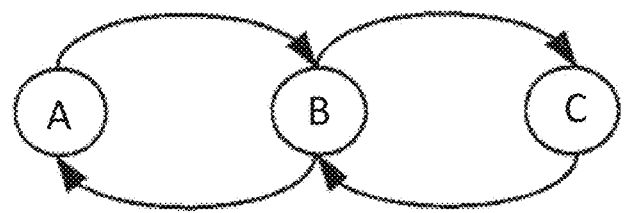
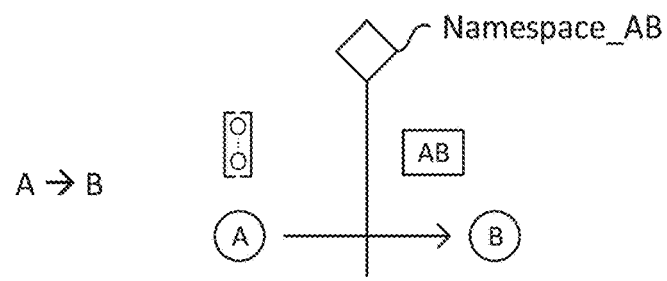
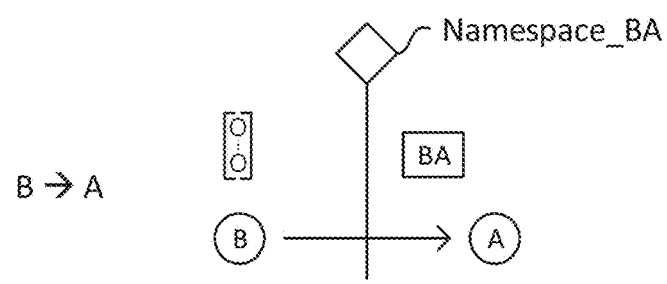
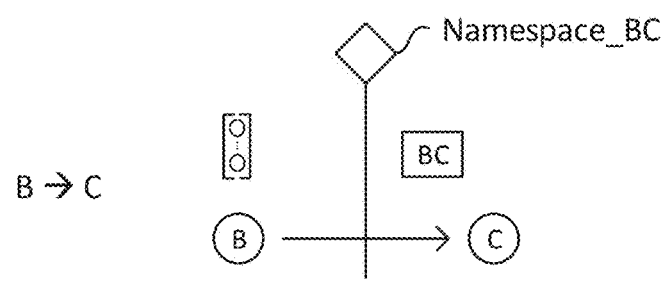
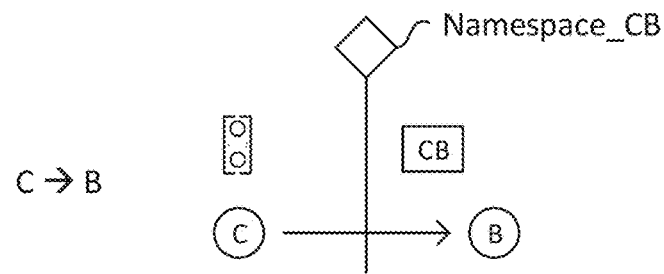
FIG. 10

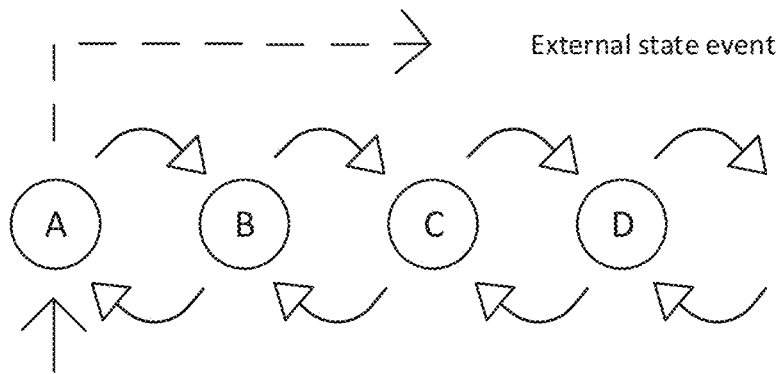
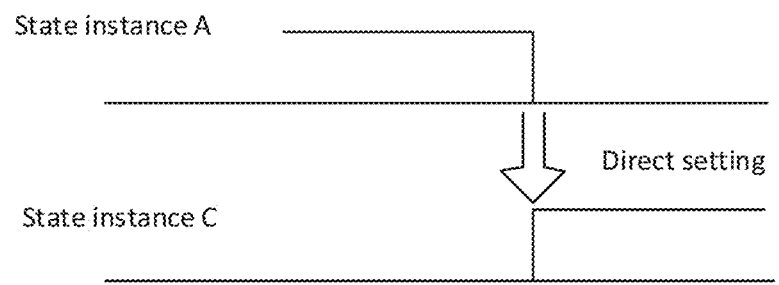
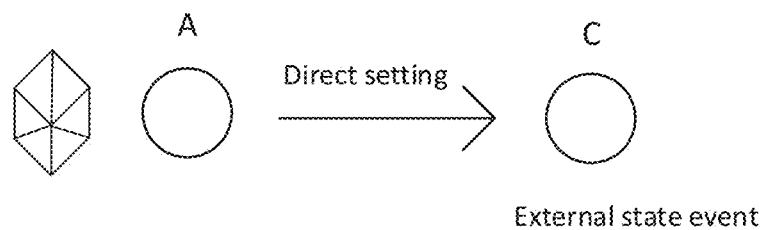
FIG. 15

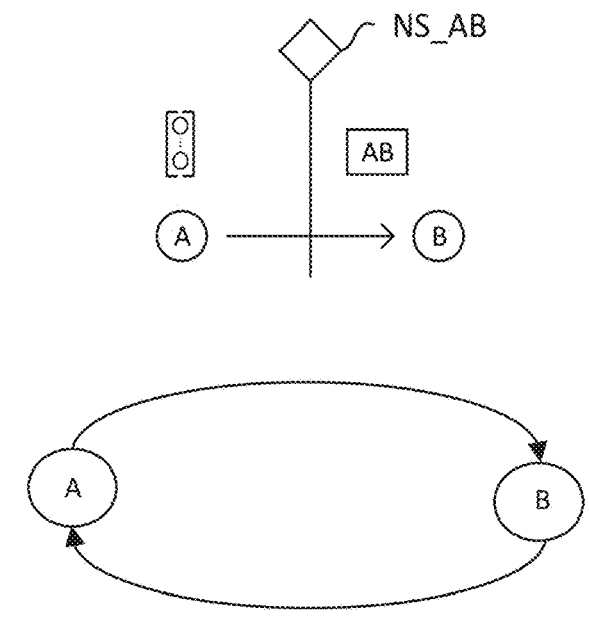
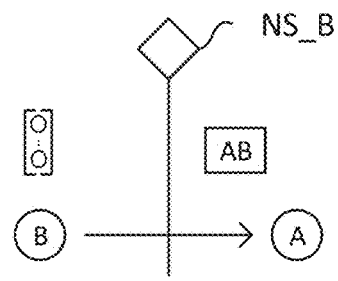
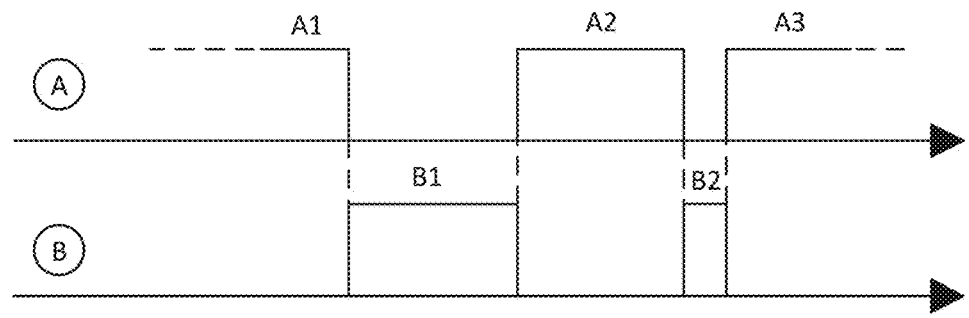
FIG. 19

PROCESS CONTROL USING DIGITAL TWINS

CROSS-REFERENCE TO RELATED APPLICATIONS

This Application is a Continuation of U.S. application Ser. No. 17/882,074, filed Aug. 5, 2022, entitled "PROCESS CONTROL USING DIGITAL TWINS". The entire contents of these applications are incorporated herein by reference in their entirety.

FIELD OF INVENTION

The present invention relates to a controller service system implementing an event-driven process control in a digital twin domain for control of process entities operated in a process domain, to controller service modules operated in the controller service system, and methods of operating the controller service system and the controller service modules.

BACKGROUND OF INVENTION

Today digital twins are used as digital counterpart of physical assets, processes, or even in-material objects in a real-world environment. Digital twins are also used to virtually represent operative data like movements, forces or interactions that physical assets can undergo in the real-world environment.

Today deployments of digital twins mainly focus on data interaction in real time, e.g., to improve access to data, to reduce maintenance costs, to enhance process decisions, to improve operational efficiency or to support quality control.

However, while digital twins allow to gather extensive data in real time the use of gathered for process control in an efficient for process domains like manufacturing, automotive, healthcare, etc. still is a technical field under development.

SUMMARY OF INVENTION

In view of the above, the technical problem underlying the present invention is to provide an approach to digital twin-based process control for efficient and accurate achievement of process objectives.

According to a first aspect of the present invention this technical problem is achieved by a controller service module running an event-driven control process in a digital twin domain for control of process entities operated in a process domain, wherein in the digital twin domain a behavior of process entities is modeled through execution of state machine models.

According to the first aspect the controller service module comprises an inbound interface adapted to asynchronously receive event data created with respect to process entities in the process domain and/or event data created through execution of state machine models in the digital twin domain.

According to the first aspect the controller service module further comprises an inbound buffer adapted to distribute received event data to a process cycle buffer such that every distributed event datum is represented as an input state according to an instance of a state in a relevant state machine model that maps to the event datum.

According to the first aspect the controller service module further comprises a model-based process controller adapted to read at least one input state from the process cycle buffer in processing cycles and to control the selected process entities. The model-based process controller operates a state machine execution module adapted to operate at least one relevant state machine model to reflect the input of at least one input state. The model-based process controller further operates a process control module adapted to which is check whether the operation of the at least one relevant state machine model triggers generation of an external control command to instruct an external control operation in the process domain.

According to the first aspect the controller service module further comprises an outbound interface adapted to output every generated external control command to at least one process entity processing the external control command.

According to a second aspect of the present invention the technical problem outlined above is achieved by a controller service system implementing an even-driven process control in a digital twin domain for control of process entities operated in a process domain, wherein in the digital twin domain the behavior of process entities is modeled through execution of state machine models as referenced by digital twins.

According to the second aspect the controller service system comprises at least one controller service module according to the first aspect of the present invention, wherein each digital twin representing a process entity is assigned to exactly one controller service module for execution thereof.

According to the second aspect the controller service system further comprises at least one messaging communication channel per controller service module for loosely coupling controller service modules through exchange of state messages over messaging communication channels connecting the controller service modules.

According to a third aspect of the present invention the technical problem outlined above is achieved by a control method of running an event-driven control process in a digital twin domain for control of process entities operated in a process domain, wherein in the digital twin domain the behavior of process entities is modeled through execution of state machine models. Here, the control method operates in processing cycles to continuously execute first to fifth steps.

According to the third aspect a first step executes asynchronous receipt of event data created with respect to process entities in the process domain and/or event data created through execution of state machine models in the digital twin domain and of storing received event data in an inbound buffer.

According to the third aspect a second step executes distribution of received event data from the inbound buffer to a process cycle buffer at the beginning of every process cycle, wherein every distributed event datum is represented in the process cycle buffer as an input state according to an instance of a state in a relevant state machine model that maps to the event datum.

According to the third aspect a third step relates to execution of a model-based control process for control of selected process entities by reading at least one input state from the process cycle buffer as stored for the processing cycle and of operating at least one relevant state machine model to reflect the input of at least one input state.

According to the third aspect a fourth step checks whether the operation of the at least one relevant state machine model triggers an external control operation in the process domain.

According to the third aspect a fifth step generates an external control command to instruct the external control operation in the process domain and of outputting the generated external control command to at least one process entity processing the external control command when the operation of the at least one relevant state machine model triggers the external control operation.

According to a fourth aspect of the present invention the technical problem outlined above is achieved by a method of operating a controller service system implementing an even-driven process control in a digital twin domain for control of process entities operated in a process domain.

According to the fourth aspect a first step assigns an operation of a digital twin representing a process entity to exactly one controller service module for execution thereof.

According to the fourth aspect a fourth step operates the at least one controller service modules for implementation of the even-driven process control of process entities while loosely coupling the at least one controller service module through exchange of state messages over at least one messaging communication channel connecting the at least one controller service module.

BRIEF DESCRIPTION OF DRAWING

In the following examples illustrating the implementation of the present invention will be explained with reference to the drawing in which:

FIG. 9 shows an outline of a twin template used for modelling of digital twins on a level of system modelling, a digital twin schema used for creation of digital twin instances during operation of the controller service system as shown in FIG. 5, and a state schema used state instances in real time during operation of the controller service system as shown in FIG. 5;

FIG. 10 shows an example for a decomposition of a state machine model into a related set of state transition activities for subsequent execution of the state machine model in real time;

FIG. 15 shows an overview on a direct setting of a state in a state machine model underlying the event-driven process control according to the present invention;

FIG. 19 shows an execution of multiple state transition activities for a state machine model and related creation of a plurality of states of state machine model over time;

DETAILED DESCRIPTION OF INVENTION

Figure 1:
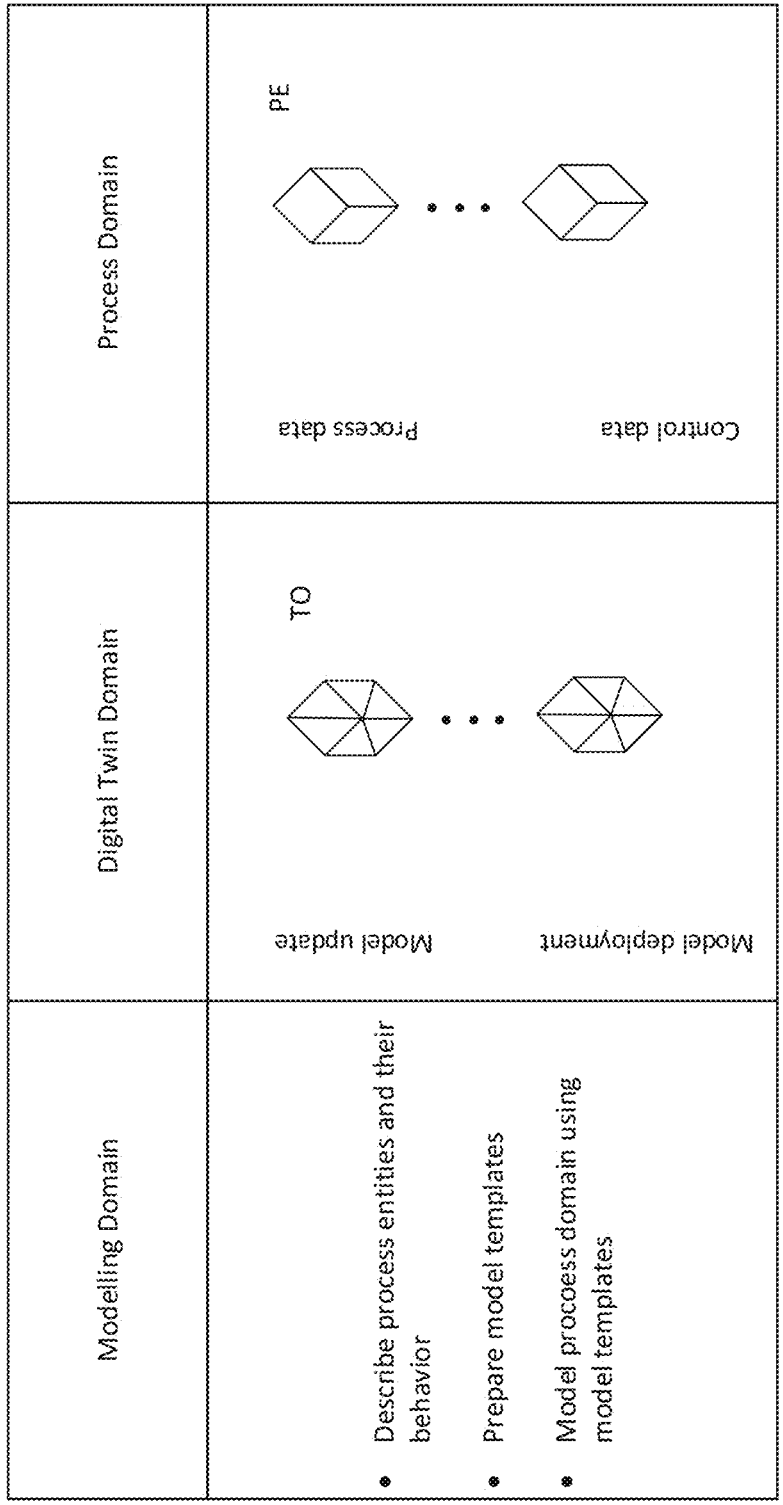
FIG. 1 shows interoperability between a process domain and a digital twin domain and further between the digital twin domain and a modelling domain as basis for implementation of a digital twin control of process entities in the process domain according to the present invention.

In the following, the present invention will be explained in detail with reference to the drawing. Here, it should be understood that such explanation is related to examples of the present invention only and not binding to the scope of the present invention as defined by the claims.

As far as reference is made to specific procedural or structural components, this is to be considered as example for the underlying functionality, where the procedural or structural components are clearly exchangeable as long as the same functionality is achieved. Thus, the present invention will be explained using generic terminology to avoid restriction of the scope of protection.

FIG. 1 shows interoperability between a modeling domain and a digital twin domain and further between the digital twin domain and a process domain as basis for implementation of a digital twin control of process entities in the process domain according to the present invention.

As shown in FIG. 1, according to the present invention the basis for control of process entities in the process domain through operation of digital twins in the digital twin domain is the use of behavioral models of process entities which are executed by digital twins. Generally, according to the present invention behavioral models are implemented as state machine models deployed in the digital twin domain as behavioral representation and counterpart of the process domain.

As shown in FIG. 1, according to the present invention data exchange is executed in a bidirectional manner from the process domain to the digital twin domain for gathering of data processed through execution of the state machine models on the one hand and in reverse direction for control of process entities on the other hand.

As shown in FIG. 1, process data is forwarded from the process domain to the digital twin domain and then used by a control logic embedded into the twin objects for set-up of control commands and related control data. Once the control data is available, it is then forwarded form the digital twin domain into the process domain accordingly. Therefore, the present invention achieves active implementation of control logic and interoperability with the process domain by forwarding of control commands to process domain in observation of process objectives.

As shown in FIG. 1, another aspect underlying event-driven process control according to the present invention is the description of the behavior of process entities using behavioral models.

Heretofore, in the modelling domain, process entities described by their behavior with behavioral models. This description allows to prepare libraries of model templates, which are then used to model existing process entities by referencing the model libraries.

As shown in FIG. 1, also the exchange of data between the digital twin domain and the modelling domain is executed in a bi-directional manner. Thus, it is possible to forward actual observation data during operation in the digital twin domain back to the modelling domain for an achievement of a model update. Model updates are related either to a modification of existing behavioral models or to a deployment of new behavioral models which are installed in the digital twin domain, e.g., due to operation of process entities in the process domain which have not been considered so far.

Overall, according to the present invention operation of digital twins may be highly interactive, both, with respect to the modelling domain and the process domain. Bi-directional data exchange between the modelling domain and the digital twin domain allows for model updating and continued model deployment.

Further, gathering of process data in digital twins allows operation of control logic embedded into the digital twin for subsequent control of process entities in the process domain and achievement of process objects.

Figure 2:
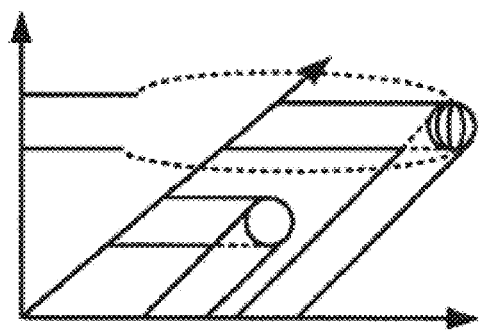
FIG. 2 shows a characterization of states which are embedded into a state space as sub-spaces of the state space.
Figure 3:
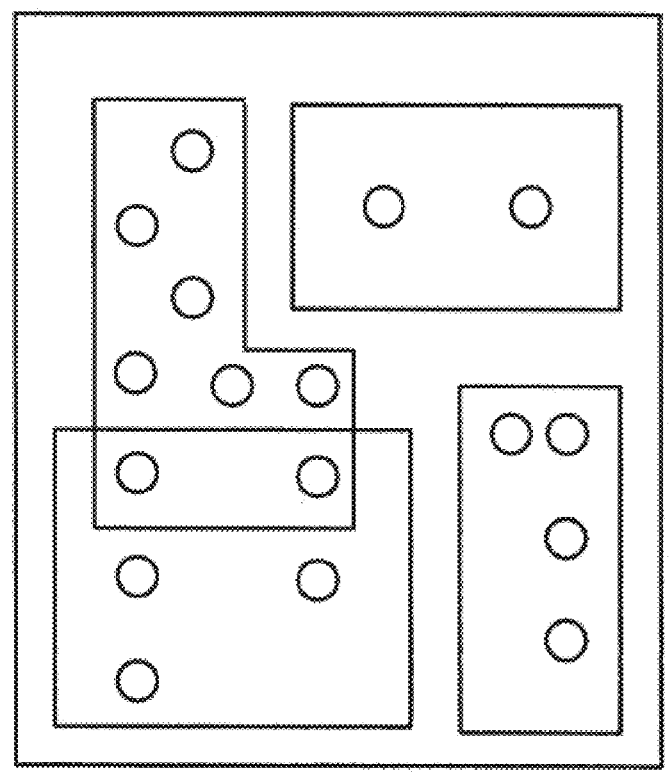
FIG. 3 shows a classification of a given set of states representing status information with respect to a digital twin according to different perspectives on a behavior of the digital twin.
Figure 4:
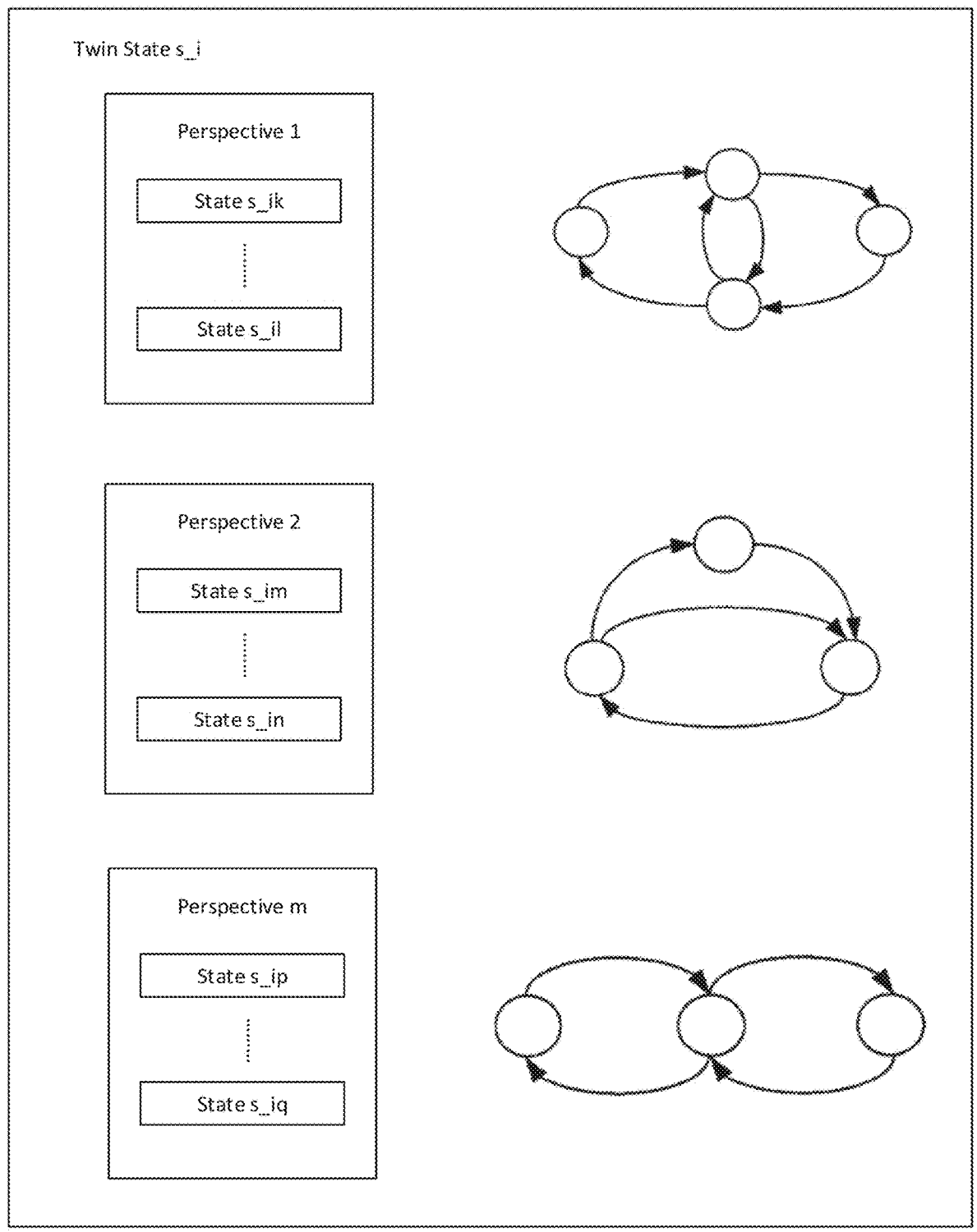
FIG. 4 shows a relation between a state of a digital twin, perspectives on the digital twin, and state machine models as well as related states being executed according to state machine models.

FIGS. 2 to 4 show a general outline of a behavioral model used according to the present invention to represent the behavior of process entities operated in the process domain by digital twins running the behavioral model in the digital twin domain.

FIG. 2 shows a characterization of states which are embedded into a state space as sub-spaces of the state space.

As shown in FIG. 2, a state of a state machine model represents a status of a digital twin in the digital twin domain prior to execution of a related state transition activity.

As shown in FIG. 2, the status may be described in an n-dimensional space of each representing a representation property and a state may then cover any defined sub-space of the n-dimensional space.

According to the present invention states may have different types of abstraction for representation of process conditions like representation on a meta level, representation on a semantic level, indication of ranges, and/or specification of a data value.

These different types of abstraction for state representation reduce complexity in control of process entities. E.g., to specify a control of a process entity one could set a specific target value out of an infinite number of values. Nevertheless, an abstraction of real number to a range of real values like low value, medium value, high vale may reduce the complexity of control significantly.

FIG. 3 shows a classification of a given set of states representing status information with respect to a digital twin according to different perspectives on behavior of the digital twin.

As shown in FIG. 3, a state machine representation of a digital twin may be structured into different perspectives on the digital win modelled through the state machine representation.

Here, any perspective on the digital twin is modelled by a related state machine model running at least a subset of all states which are used to model the behavior of the digital twin under a certain perspective. For every perspective there is set-up a related state machine model having state transition activities which are defined independently from other perspectives.

FIG. 4 shows a relation between a meta state of a digital twin, related perspectives on the digital twin, and state machine models an related states being executed according to each perspective on the digital twin;

As shown in FIG. 4, for every perspective the related every state machine model is a model of computation that is in one of a plurality of states at any time. To put it differently it may be said that every state has at least one relevant perspective.

In conclusion, the present invention uses behavioral models in the form of at least one state machine model. Here, every state machine model is a model of computation that is in one of a plurality of states at any time. Further, the state machine model can transit from a source state to a target state through execution of the related state transition activity.

Further, the introduction of perspectives on state machine models allows for independent operation of state machine models having a different perspective and therefore supports parallelization. Typically, at a point in time per perspective there exits exactly one state that is active or in words valid.

Figure 5:
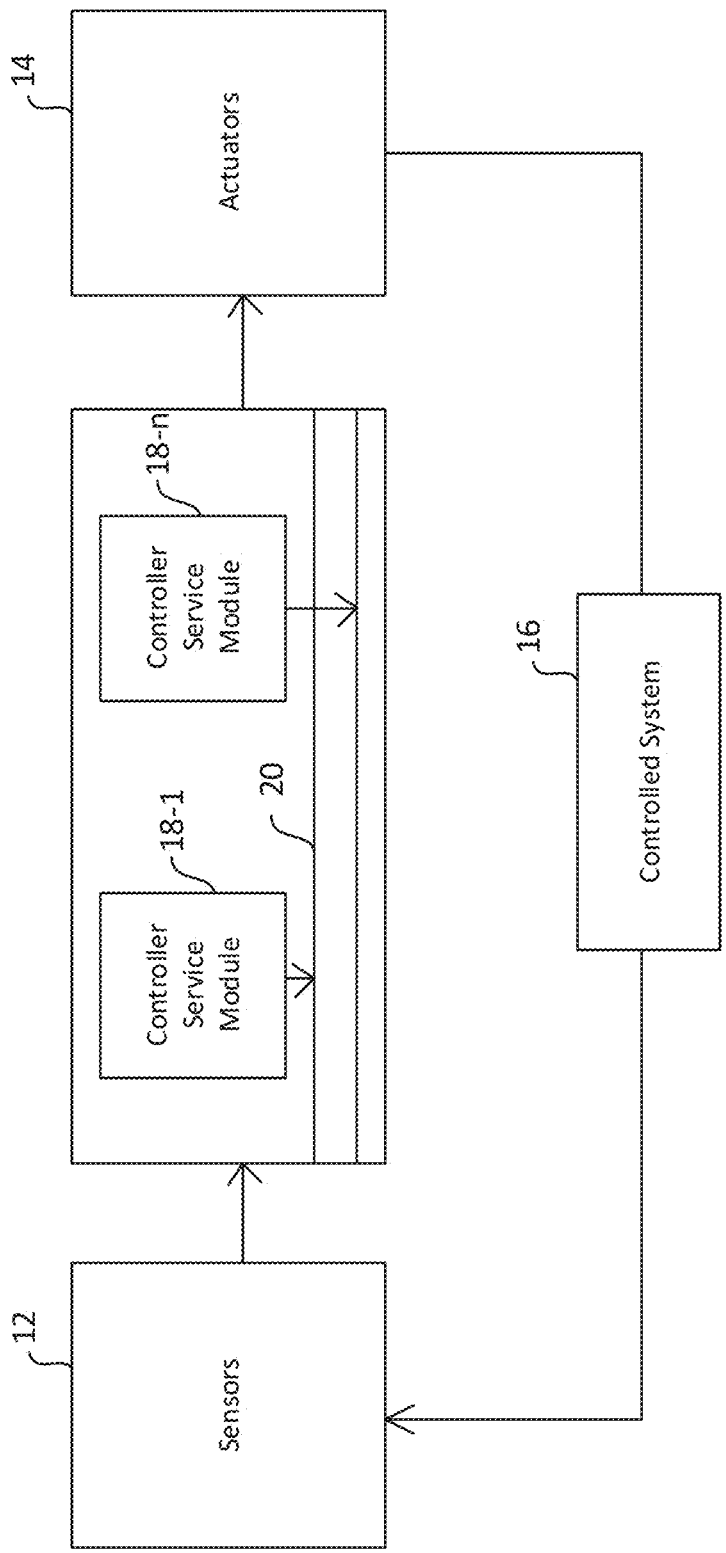
FIG. 5 shows a schematic diagram of a controller service system implementing an event-driven control process in a digital twin domain for control of process entities operated in a process domain according to the present invention.

FIG. 5 shows a schematic diagram of a controller service system implementing an event-driven control in a digital twin domain for control of process entities operated in a controlled system according to the present invention.

As shown in FIG. 5, according to the present invention, the controller service system 10 interoperates with sensors 12 providing input data to the controller service system 10 and actuators 14 acting on a control system 16 to achieve process objectives. The controller service system 10 comprises controller service modules 18-1, . . . , 18-n which communicate internally in the controller service system via a message communication channel 20.

As indicated with respect to FIG. 1 above, according to the present invention prior to operation of the controller service system 10 behavioral models of physical entities operated in the process domain are deployed into control service modules 18-1, . . . , 18-n. Then, digital twins running the behavioral models may continuously operate in processing cycles on input data images provided by the sensors 12.

According to the present invention sensor data is received continuously and asynchronously in real-time and parallel manner. Asynchronous communication is a prerequisite to parallelization of receipt of sensor data and related parallel operation of controller service modules 18-1, . . . , 18-n.

Further, according to the present invention, controller service modules 18-1, . . . , 18-n are adapted to analyze input data for identification of deviations between actual behavior of process entities and process objectives. This triggers generation of control commands which are forwarded to the actuators 14 and the controlled system 16 in real-time and in asynchronous manner.

According to the present invention, such control commands are output to the control system immediately upon generation thereof, in asynchronous and over a plurality of communication channels to achieve parallelization of outbound communication.

From this, the present invention allows to transfer control logic previously hard coded into process entities to the controller service system 10 which is of particular benefit for cloud applications. Controller services may be configured flexibly according to need and may be extended remotely over the course of time.

Figure 6:
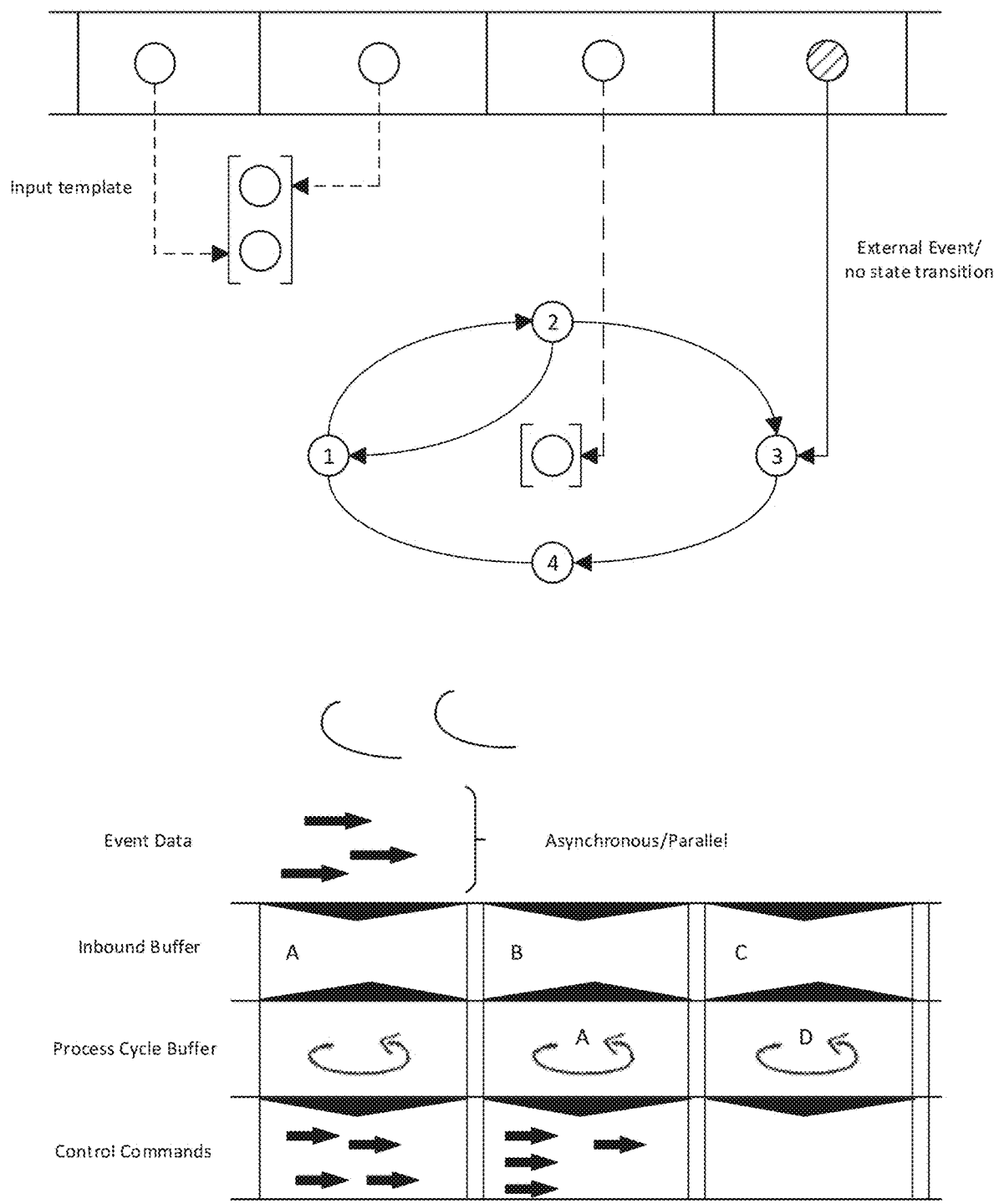
FIG. 6 shows basic principles underlying the operation of the controller service system as shown in FIG. 5.

FIG. 6 shows basic principles underlying the operation of the controller service system as shown in FIG. 5.

As shown in FIG. 6, according to the present invention it is suggested to operate data exchange between the real-world environment and the controller service system 10 to run behavioral models. Such behavioral models are set up from states and related state transitions as state machine models, e.g., as finite state machines. Then, events occurring in the controlled system 16 are observed by sensors 12 for inbound communication of related sensor data to the controller service system 10.

As shown in FIG. 6, according to the present invention it is suggested to execute inbound communication from the sensors 12 to the controller service system 10 by using input states. This allows efficient operation of the controller service modules 18-1, . . . , 18-n.

Similarly, according to the present invention any outbound communication from the controller service system 10 to the actuators 14 is realized in the controller service system 10 using states as defined for the behavioral models.

Further, according to the present invention any internal communication between controller service modules 18-1, . . . , 18-n in the controller service system 10 is also implemented using states through exchange of state messages over the state message communication channel 20.

As shown in FIG. 6, through asynchronous parallel communication of sensor data to the controller service system 10 and through internal communication between control service modules 18-1, . . . , 18-n there occurs a continuous stream of related external states and internal states in the form of input states.

As shown in FIG. 6, with respect to processing of input states according to the present invention there is no differentiation between external states—shown shaded in FIGS. 6—and internal states. Thus, external states and internal states are considered in an integrated manner.

As shown in FIG. 6, in an illustrative example for a state machine model may have four states 1, 2, 3, 4 with predetermined state transitions. The input states may have a sequence of any type. Further, as will be explained in detail in the following an input template may be used to form a control flow for the decision on state transitions. To be more the specific.

As shown in FIG. 6, for the given example the first two states are entered into the input template and only when the input template is completed then the state transition from the first to the second state is executed. Similarly, upon input of a further state forming the input template for a state transition from the second to the first state the state transition back to the first state is executed.

As shown in FIG. 6, an import aspect of the present invention is that process control is event driven. Once an external event occurs the external state—illustrated in shaded representation—will be set immediately, e.g., as shown for the fourth input state in FIG. 6.

Such direct setting of external states in the behavioral model allows to achieve improved coupling between the digital twin domain and the process domain. This particularly applies in view of the asynchronous communication avoiding delay in submission of information to the digital twin domain and in view of a parallel execution of asynchronous communication.

As shown in FIG. 6, the operation of the controller service modules is implemented in process cycles, e.g., a cycle A, a cycle B, . . . . As external event data and related states is forwarded continuously, asynchronously and in parallel manner, the event data is stored in an inbound buffer during each single process cycle. Then, at the end of each process cycle, the data accumulated in the inbound buffer is loaded into the process cycle buffer for execution of a next process cycle. From this, an input data image is frozen during each execution of a process cycle.

As shown in FIG. 6, according to the present invention generated control commands are output immediately or within a predetermined allowable delay to the process domain again through asynchronous, parallelized communication.

Figure 7:
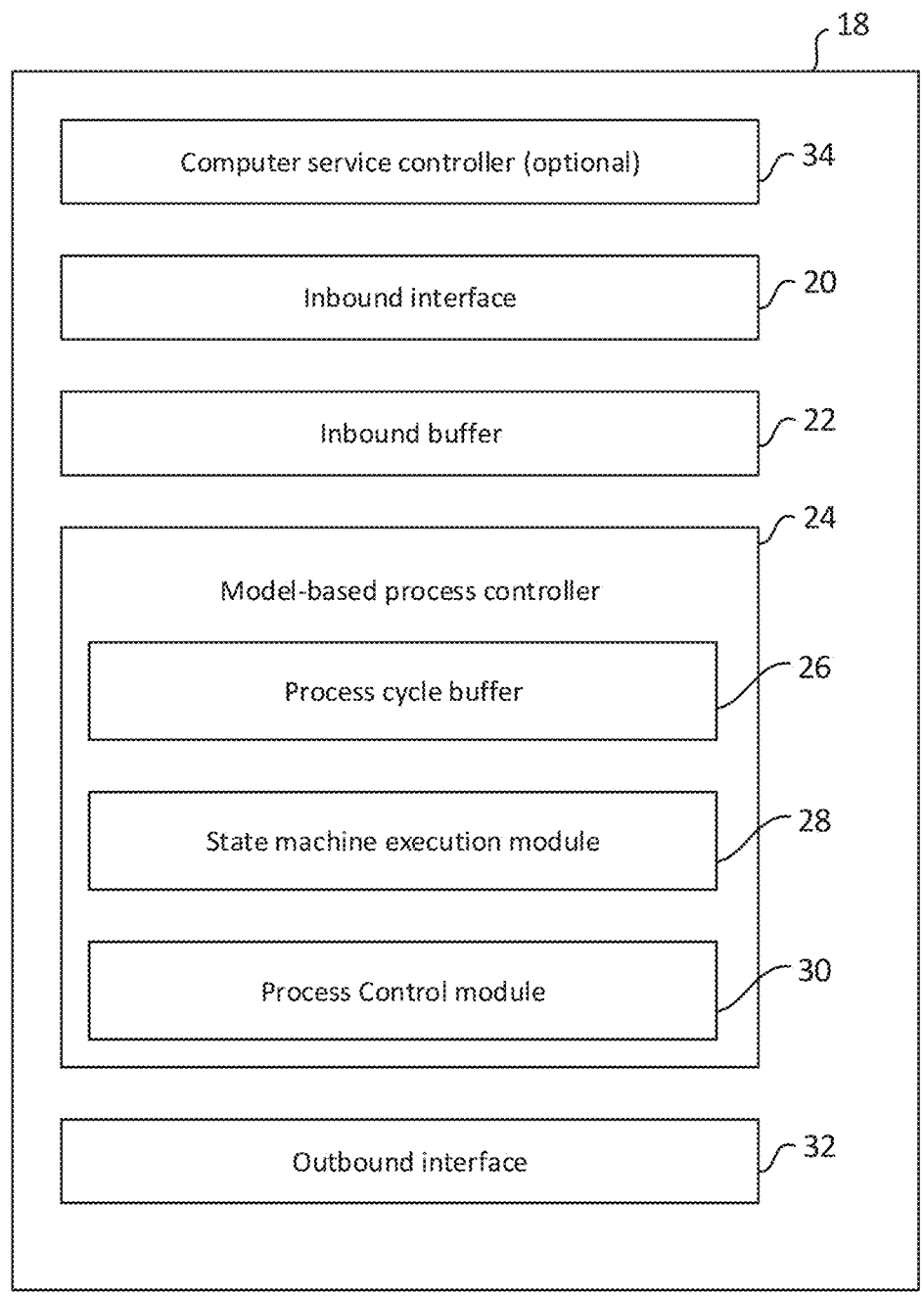
FIG. 7 shows a schematic diagram of a controller service module operated in the controller service system as shown in FIG. 5.

FIG. 7 shows a schematic diagram of a controller service modules 18 as operated in the controller service system 10 as shown in FIG. 5.

Generally, the controller service module 18 shown in FIG. 7 runs an event-driven control process in a digital twin domain for control of process entities operated in a process domain. A indicated above, according to the present invention the behavior of process entities is modeled through execution of state machine models.

As shown in FIG. 7, the controller service module 18 comprises an inbound interface 20 adapted to asynchronously receive event data created with respect to process entities in the process domain and/or event data created through execution of state machine models in the digital twin domain.

As shown in FIG. 7, the controller service module 18 comprises an inbound buffer 22 adapted to distribute received event data. According to the present invention each event datum is represented as input state of one of the behavioral models operated within the controller service system 10, i.e., as an instance of a state in a relevant state machine model that maps to the event datum.

As shown in FIG. 7, the controller service module 18 comprises a model-based process controller 24 adapted to read at least one input state from the inbound buffer 22 and to store it in a process cycle buffer 26 in processing cycles for control the selected process entities.

As shown in FIG. 7, the controller service module 18 comprises a state machine execution module 28 adapted to operate at least one relevant state machine model to reflect the input of at least one input state.

As shown in FIG. 7, the controller service module 18 comprises a process control module 30 adapted to check whether the operation of the at least one relevant state machine model triggers generation of an external control command to instruct an external control operation in the process domain.

As shown in FIG. 7, the controller service module 18 comprises an outbound interface 32 adapted to output every generated external control command to at least one process entity processing the external control command.

As shown in FIG. 7, the controller service module 18 may comprise a computer service module controller 34 as an option to coordinate the configuration and operation within the compute service module. Typically, the controller service module controller 34 will deploy and update of service configuration with the controller service module and coordinate the interoperation of its sub-components.

Figure 8:
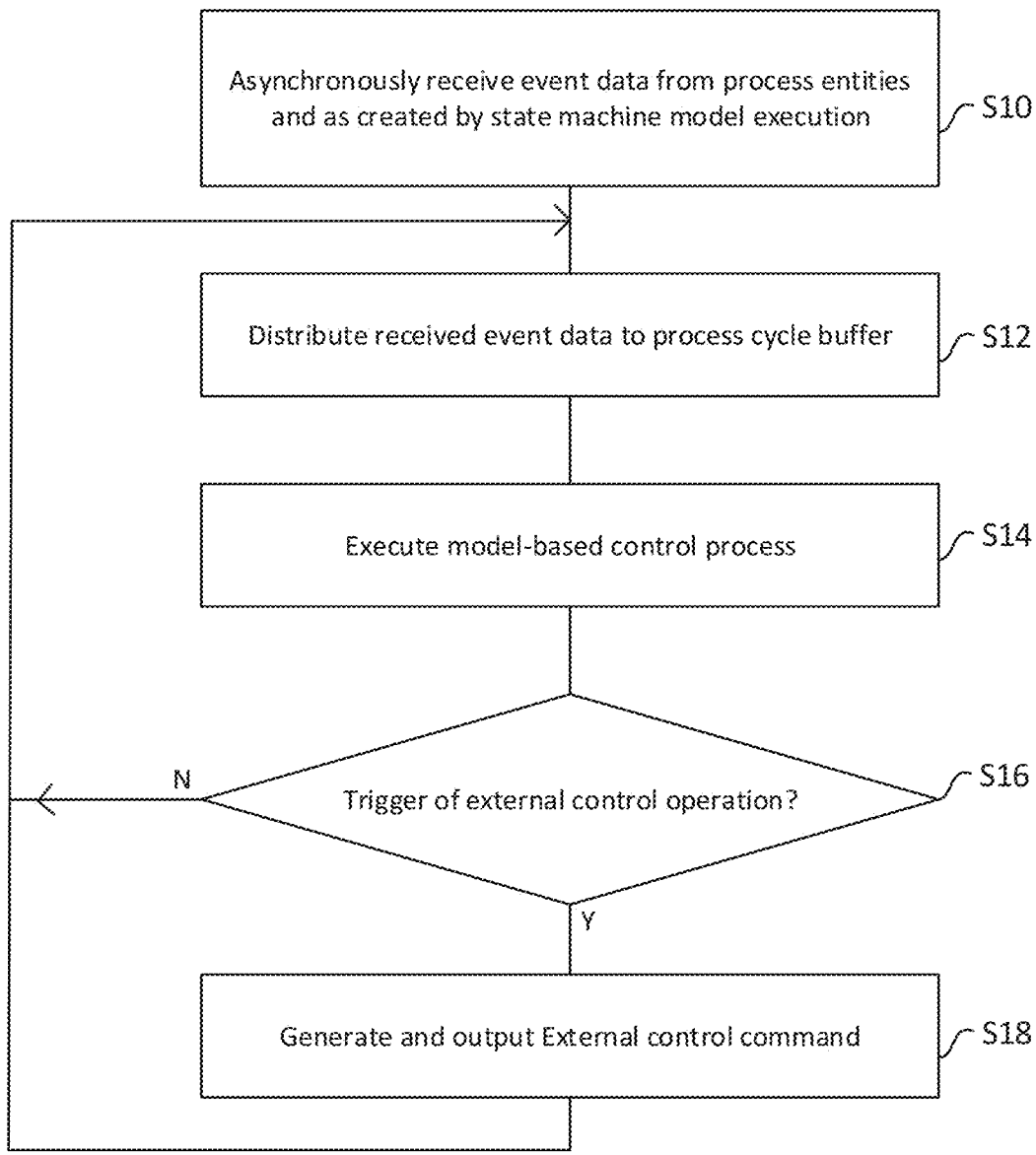
FIG. 8 shows a flowchart of operation for the controller service module as shown in FIG. 7.

FIG. 8 shows a flowchart of operation for the controller service module as shown in FIG. 7.

As shown in FIG. 8, in a step S10 executed by the inbound interface 20, event data is received asynchronously. According to the present invention received event data may be created with respect to process entities in the process domain and/or event data may be created through execution of state machine models in the digital twin domain.

As shown in FIG. 8, in a step S12 executed by the inbound buffer 22, received event data is distributed to the process cycle buffer 26 such that every distributed event datum is represented as an input state according to an instance of a state in a relevant state machine model that maps to the event datum.

As shown in FIG. 8, in a step S14 executed by the state machine execution module 28, at least one input state is read from the process cycle buffer 26 in processing cycles. For control of selected process entities at least one relevant state machine model is executed to reflect the input of at least one input state.

As shown in FIG. 8, in a step S16 executed by the process control module 28, it is checked whether the operation of the at least one relevant state machine model triggers generation of an external control command to instruct an external control operation in the process domain.

As shown in FIG. 8, in a step S18 executed by the outbound interface 32, every generated external control command is output to at least one process entity processing the external control command.

According to the present invention the output of control commands is initiated upon generation thereof or at least within a specified allowable delay range. This increases significantly a responsiveness of the event-driven control process to sensor data input from the process domain.

FIG. 9 shows a twin template used for modelling of digital twins on a level of system modelling, a digital twin schema used for creation of digital twin instances during operation of the controller service system as shown in FIG. 5, and a state schema used for creation of state instances in real time during operation of the controller service system as shown in FIG. 5.

As shown in FIG. 9, for every digital twin a twin template and a twin scheme is used for the modelling and generation of digital twins. The difference between the twin template and the twin scheme is that the twin template reflects capabilities of a twin object as modelled in the modelling domain while the twin scheme reflects the actual capability of an instantiated digital twin during run-time. In other words, the functionality of a twin object may be a subset of capabilities provided for in the modelling domain and as represented by the twin template.

As shown in FIG. 9, in the twin template there is provided a field for a twin ID, for a twin model reference, and a twin identification characterizing a twin object, e.g., by a name reference.

As shown in FIG. 9, on the modelling level each digital twin is described by custom fields, specifying state machine models representing behavior of process entities, perspectives on the state machine models and related initial states, properties specified for a digital twin template and attributes as well as contexts representing an operational embedding of a digital twin on a modelling level. Also, the twin template carries information on connectivity of states in the state machine models, which connectivity is related to interaction between states in the state machine models and process entities in the process domain as will be explained in more detail in the following.

As shown in FIG. 9, for the actual creation of a digital twin there is used a twin schema referenced during operation of the service controller module 18. Twin IDs may be instantiated, e.g., as integer value, model references specify applicable state machine models and contexts specify interoperability between digital twins and access of digital twins to computing resources operated in the service controller system 10. Further, custom fields are instantiated depending on types of applicable state machine models, properties, attributes, contexts, and connectivity.

As shown in FIG. 9, another schema to be operated by the service controller modules relates to the generation of states. As shown in FIG. 9, every state or equivalently state type is characterized by an ID, by a reference to the state machine model and perspective, by a reference to its twin object, and a reference to the model referenced by the twin object.

As shown in FIG. 9, every state may carry a payload and information relating to context references. It should be noted that preferably a state carries all contexts of its digital twin to increase efficiency during real-time processing of the event-driven control process.

As shown in FIG. 9, the state inherits connectivity as specified in the related digital twin scheme. It should be noted that according to the present invention every state may have a plurality of communication options to for communication with different process entities.

In view of the above, according to the present invention schemes for a digital twin or for a state in a state machine model are used as instructions for memory allocation and subsequent filling of the allocated memory with data.

It is important to note that according to the present invention digital twins carry control logic so that a digital twin may execute any control operation for process entities in the process domain. This active role of digital twins for control of process entities allows to implement a master-slave-scheme between a digital twin operated in the digital twin domain and its related process entity in the process domain and empowers digital twins with control capabilities previously hard coded into process entities.

FIG. 10 shows an example for a decomposition of a state machine model into a related set of state transition activities for subsequent execution of the state machine model in real time.

As shown in FIG. 10, the state machine model can transit from at least one source state to at least one target state through execution of at least one state transition activity. A state transition may be executed by a related state transition activity, preferably under the condition that a pre-determined state transition condition is met.

As shown in FIG. 10, a state transition condition may be represented by a state template used to model a state context reflecting a co-existence of a predetermined set of states in one or more state machine models across the digital domain during run time. State contexts reflect process events with relate to each other. Further, the definition of a state template is a matter of modelling the process domain and may vary with respect to a same state machine model and related state transition activity for different applications thereof.

It should be noted that according to the present invention the application of state contexts as a trigger for state transition activities is optional such that also an empty state template is conceivable.

As shown in FIG. 10, a further component of a state transition activity is an activity reference, e.g., like Namespace_AB for a transition from source state A to target state B, Namespace_BA for a transition from source state B to target state C, etc. Activity references allow to point from digital twins to applicable state transition activities and thus to achieve efficient access to state transition activities during real time execution thereof without search.

As shown in FIG. 10, a further component of a state transition activity is an activity operator embedding the transfer logic underlying a state transition from a source state to a target state. The activity operator reflects the creation and initialization of the target state and allows for consideration of conditions during execution of a state transition activities. Activity operation may implement data transformation processes on operative data for subsequent representation of the transformation result through the target state.

Figure 11:
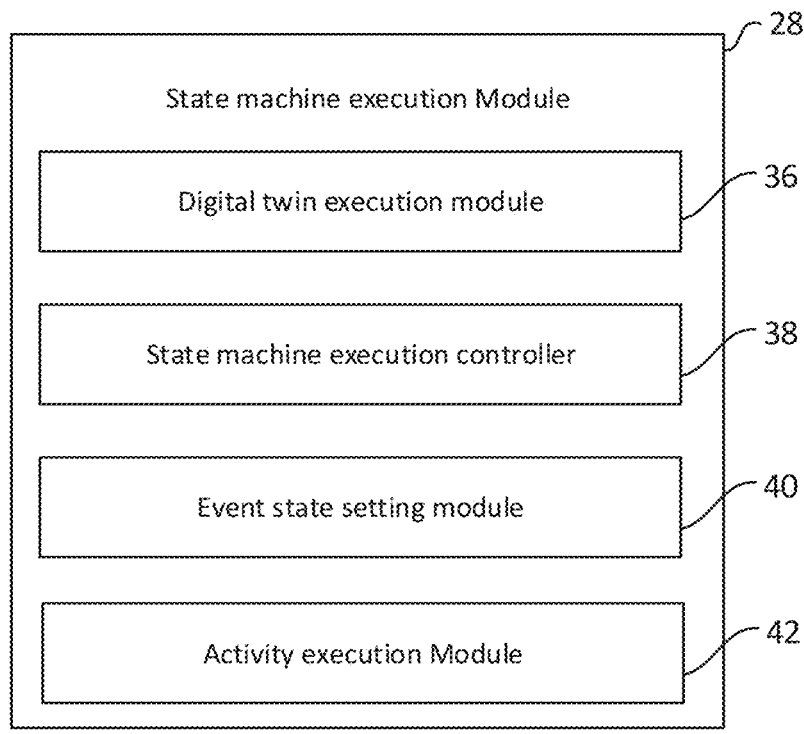
FIG. 11 shows a further detailed schematic diagram of the state machine execution module as shown in FIG. 7.

FIG. 11 shows a further detailed schematic diagram of the state machine execution module 28 as shown in FIG. 7.

As shown in FIG. 11, the state machine execution module 28 comprises a digital twin execution module 36 adapted to operate at least one digital twin in a digital twin domain and in relation to at least one selected process entity. As outlined above the digital twin embeds control logic for the at least one process entity, ingests operational data of the at least one selected process entity and references at least one state machine model to represent the behavior of the at least one selected process entity for observation and/or control thereof.

As shown in FIG. 11, the state machine execution module 28 comprises a state machine execution controller 38 adapted to check whether an input state triggers execution of a state transition activity in a state machine model or whether an input state represents an external state which is directly set in the state machine model.

As shown in FIG. 11, the state machine execution module 28 comprises an event state setting module 40 adapted to directly set an external state in a related state machine model.

As shown in FIG. 11, the state machine execution module 28 comprises an activity execution module 42 adapted to execute at least one state transition activity in relation to a state transition from a source state to a target state in at least one state machine model. The state transition activity uses an input template that models a state context as operational co-existence of predetermined states in one or more state machine models across the digital twin domain as trigger for execution of the state transition activity.

Figure 12:
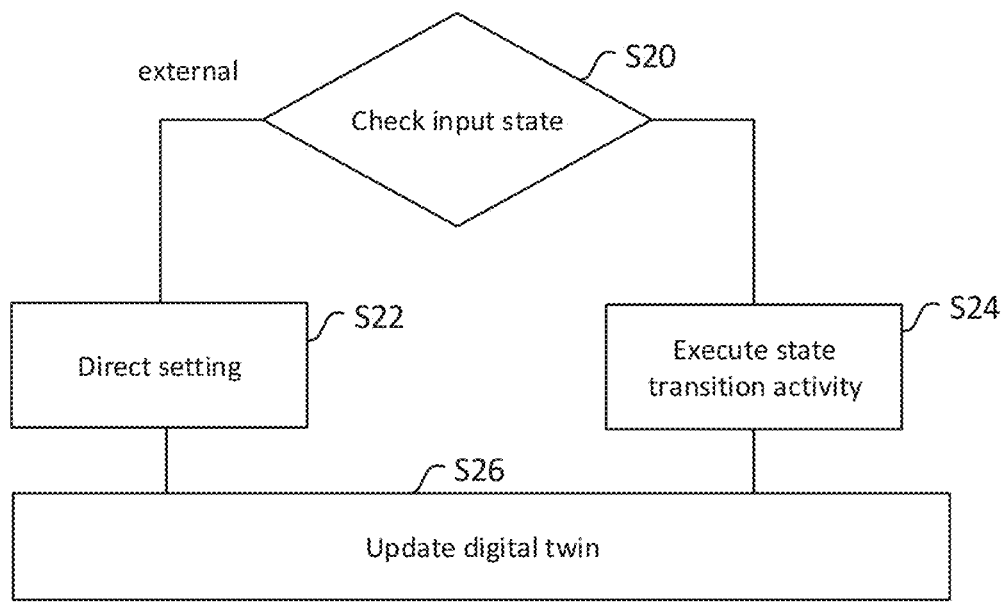
FIG. 12 shows a flowchart of operation for the state machine execution module as shown in FIG. 11.

FIG. 12 shows a flowchart of operation for the state machine execution module as shown in FIG. 11.

Generally, according to the present invention every input state processed during a process cycle will lead to the creation of a state in the digital twin domain. Then, every created state may lead to an execution of a state transition activity, to a direct setting of a state if the input state represents an external state to be considered during the event-driven process control, or to an update of an already prevailing state with respect to change of operative data in the process domain.

As shown in FIG. 12, in a step S20 executed by the state machine execution controller 38, it is checked whether an input state triggers execution of a state transition activity in a state machine model or whether an input state represents an external state which is directly set in the state machine model.

As shown in FIG. 12, in a step S22 executed by the event state setting module 40, the input state is directly set as an external state in a related state machine model when the step S20 identifies an external event.

As shown in FIG. 12, in a step S24 executed by the activity execution module 42, there is executed a state transition activity in relation to input state when the step S20 identifies an internal event. According to the present invention the state transition activity may serve to execute control logic embedded into the digital twin or to gather operational data of at least one selected process entity.

As shown in FIG. 12, in a step S26 executed by the digital twin execution module 42, there is updated at least one digital twin in a digital twin domain and in relation to the executed operations.

Figure 13:
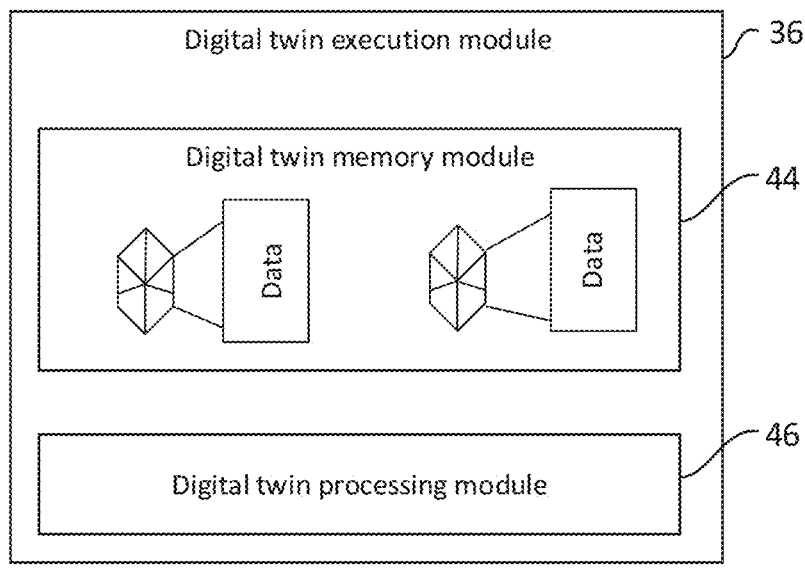
FIG. 13 shows a further detailed schematic diagram of the digital twin execution module as shown in FIG. 11.

FIG. 13 shows a further detailed schematic diagram of the digital twin execution module as shown in FIG. 11.

As shown in FIG. 13, the digital twin execution module 36 comprises a digital twin memory module 44 adapted to store operative data for the processing of the at least one digital twin in real time.

According to the present invention operative data is related to representation of the at least one digital twin, to representation of at least one state machine model as referenced by the at least one digital twin, and/or to representation of control logic embedded into the at least one digital twin.

As shown in FIG. 13, the digital twin execution module 36 comprises a digital twin processing module 46 adapted to update the operative data. The update may occur in real time upon creation of a state with respect to the at least one state machine model referenced the by at least one digital twin. Alternative the update may occur upon change of configuration of the at least one state machine model as referenced by the at least one digital twin.

Figure 14:
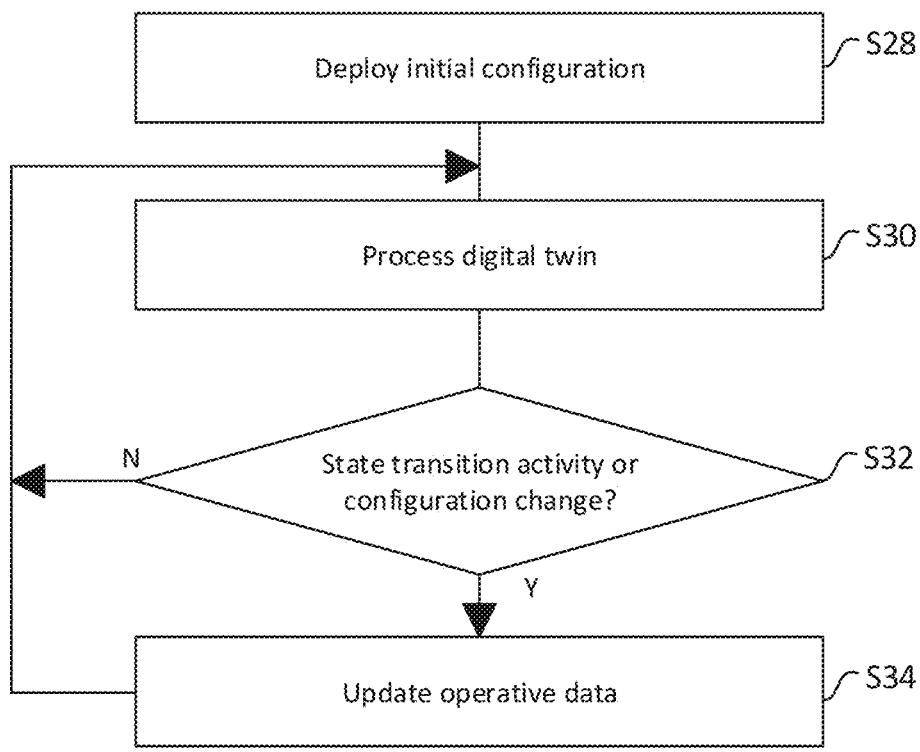
FIG. 14 shows a flowchart of operation for the digital twin execution module as shown in FIG. 13.

FIG. 14 shows a flowchart of operation for the digital twin execution module as shown in FIG. 13.

As shown in FIG. 14, in a state S28 executed by the twin processing module 46, prior to run time of the event-driven process control an initial configuration of digital twins and related configuration data is deployed in the digital twin memory module.

It should be noted that initial deployment is driven by the modelling of the process domain and its process entities as executed in the modelling domain. Initial deployment relates to representation of digital twins, to representation of state machine models as referenced by the at least one digital twin, to representation of control logic embedded into the at least one digital twin, and/or to representation of state transition activities.

As shown in FIG. 14, in a state S30 executed by the digital twin processing module 46, there is executed a continuous and repeated update of the operative data in real time upon according to the process flow in the process domain.

As shown in FIG. 14, in a state S32 executed by the digital twin processing module 46, there is executed an evaluation whether an input state is related to a creation of a state with respect to the at least one state machine model referenced the by the digital twin or is related to a change of configuration of the at least one state machine model as referenced by the at least one digital twin. If so, the digital twin processing module 46 executes a step S34 for update of operative data or update of configuration.

FIG. 15 shows an overview on a direct setting of a state in a state machine model underlying the event-driven process control according to the present invention.

As shown in FIG. 15, event-driven control according to the present invention implies direct setting of external state events.

As shown in FIG. 15, assuming that the behavioral model is in a specific state, e.g., state A, while in the real-world environment is different, e.g., according to state C, then upon input of the external event mapping to a state C, this state is immediately and directly set, without consideration of predetermined state transmissions in the behavioral model.

Such direct setting of external state events increases accuracy of behavioral modelling during runtime and increases flexibility in representation of the process domain within the digital twin domain.

Figure 16:
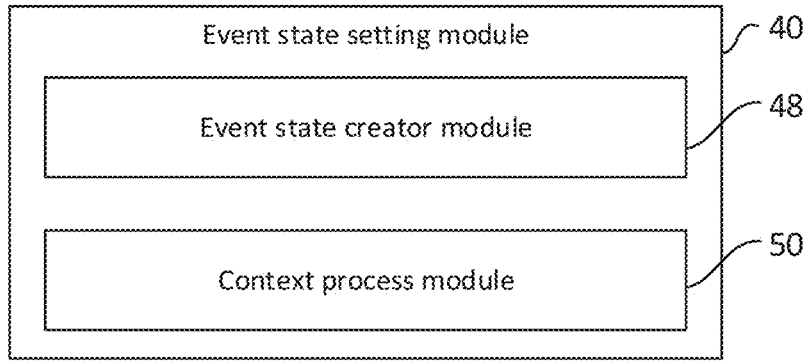
FIG. 16 shows a further detailed schematic diagram of the event state setting module as shown in FIG. 11.

FIG. 16 shows a further detailed schematic diagram of the event state setting module 40 as shown in FIG. 11.

As shown in FIG. 16, the event state setting module 40 comprises an event state creator module 48 adapted to create state according to the event state which will then be the valid state in the related state machine model.

As shown in FIG. 16, the event state setting module 40 comprises a context processing module 50 adapted to update context references used for effective execution of the state transition activity as will be explained with respect to FIG. 23.

Figure 17:
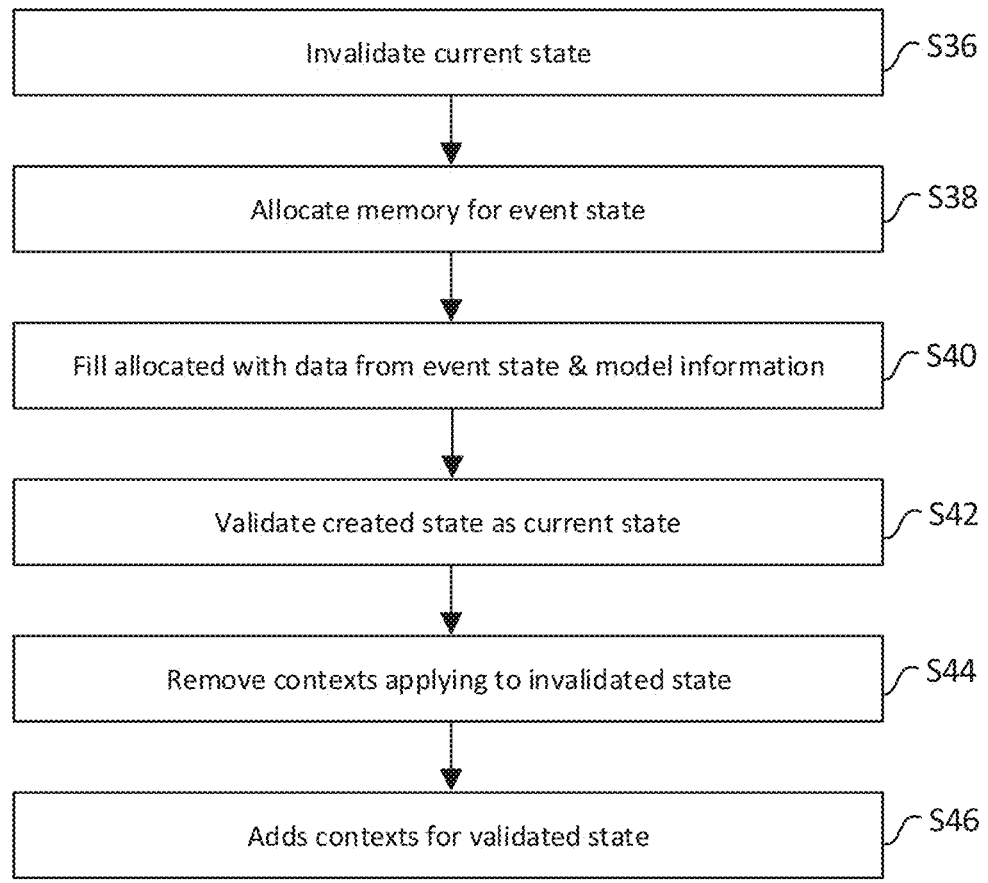
FIG. 17 shows a flowchart of operation for the event state setting module as shown in FIG. 16.

FIG. 17 shows a flowchart of operation for the event state setting module as shown in FIG. 16.

As shown in FIG. 17, in a step S36 executed by the event state creator module 48, the current state in the state machine model being related to the event state is invalidated.

As shown in FIG. 17, in a step S38 executed by the event state creator module 48, there is allocated a state memory in the digital twin memory module 44 according to a state scheme applicable to the external state. Then in a step S40 the allocated state is filled with data in line the state schema as shown in FIG. 9.

As shown in FIG. 17, in a step S42 executed by the event state creator module 48, the created state is validated as current state of the related state machine model.

As shown in FIG. 17, in a step S44 executed by the context processing module 50, context references are updated as will be explained in more detail with respect to FIG. 18. During execution of step S44 entries representing an invalidated current state in related input templates are cancelled and entries representing a validated current state in related input templates are entered.

Figure 18:
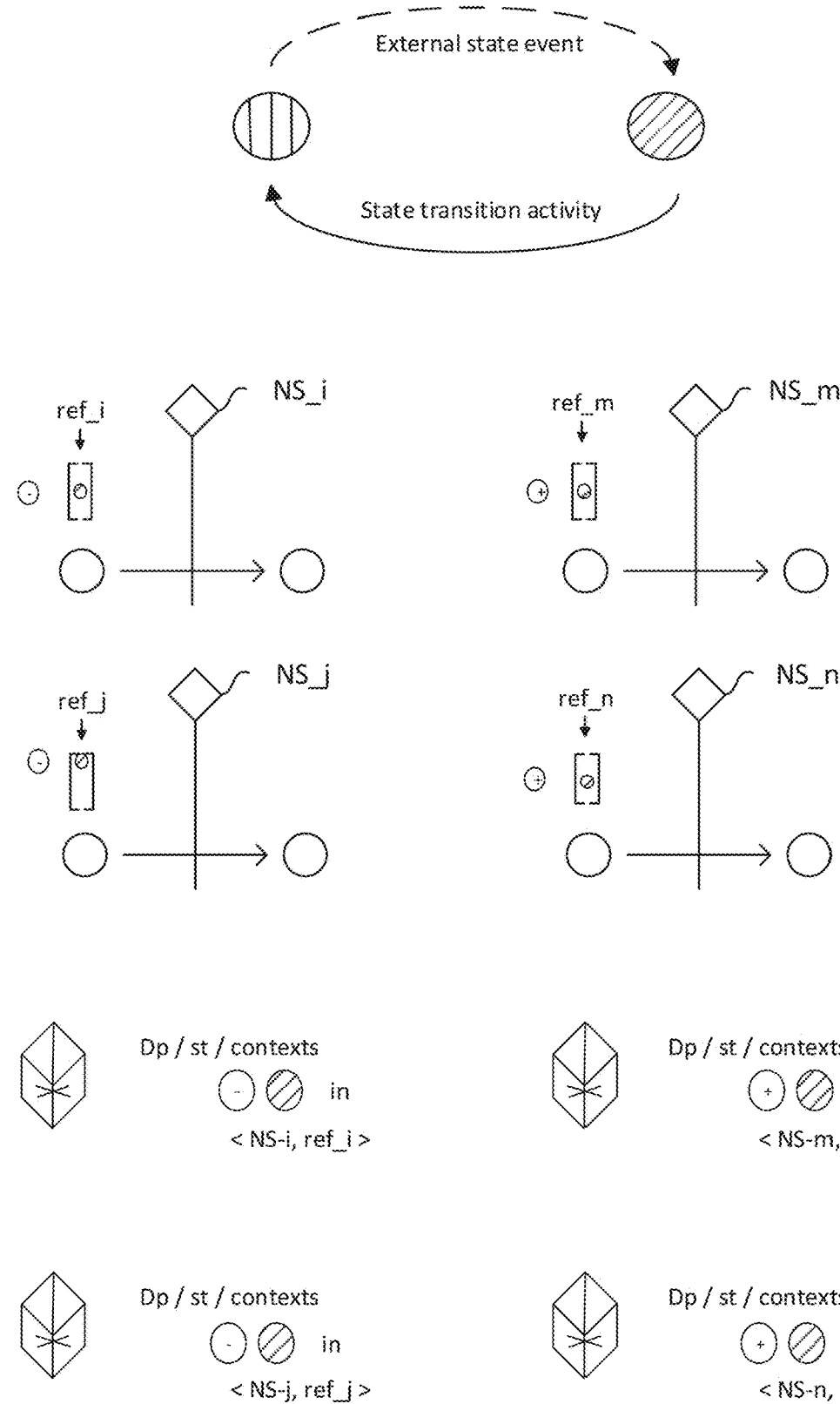
FIG. 18 shows basic principles underlying the contextualization of state transition activities and related update of state contexts.

FIG. 18 shows basic principles underlying the contextualization of state transition activities and related update of state contexts.

Generally, according to the present invention a context reference points from a digital twin to an applicable state transition activity and a related input template.

As shown in FIG. 18, every input template models operational co-existence of predetermined states in one or more state machine models across the digital twin domain as trigger for execution of the state transition activity. From this, input templates represent state contexts also referenced as inner context in the following to form a control flow for the execution of state transition activities.

It should be noted that according to the present invention the update of context references is executed in a similar manner, both, for external state event direct setting and for execution of state transition activities.

As shown on the left side of FIG. 18, source states of state transitions are cancelled from state contexts upon execution of a related state transition activity. Here, assuming that the left state is the source state, it is shown that in all state transition activities NS_i, NS_j having an input template ref_i, . . . , ref_j where the source state was previously inserted the source state will be cancelled.

Further, digital twins carry all contexts necessary to access related state transition activities. From this, during update of related context references for every relevant twin object it will be checked whether the list of context references also has a reference to relevant state transition activities, and if so, the related pair of state transition activity NS_i, ref_i, . . . , NS_j, ref_j will be removed from the list of context references.

As shown on the right side of FIG. 18, for the target state relevant state transition activities NS_m, . . . , NS_n will be checked in relation to corresponding input templates to assure that potential entries of the target state are reflected in the relevant input templates ref_m, . . . , ref_n. Also, for all twin objects the related lists of context references will be extended by newly created context pairs NS_m, ref_m, . . . , NS_n, ref_n.

FIG. 19 shows an execution of multiple state transition activities with respect to a state machine model and related creation of a plurality of states of state machine model over time.

As shown in FIG. 19, assuming an example of two states A, B and two related state transition activities NS_A, NS_B, then over time the state machine model will toggle between the state A and the state B assuming that no external events occur.

As shown the lower part of FIG. 19, then sequence of entities of state A, i.e. A1, A2, A3, will occur in combination with a sequence of entities of the state B, i.e. B1, B2.

Assuming that for each state transition states are created then the operation of the behavioral model will lead to a change log which may be used for documentation purposes or for update of behavioral models, as an example.

Figure 20:
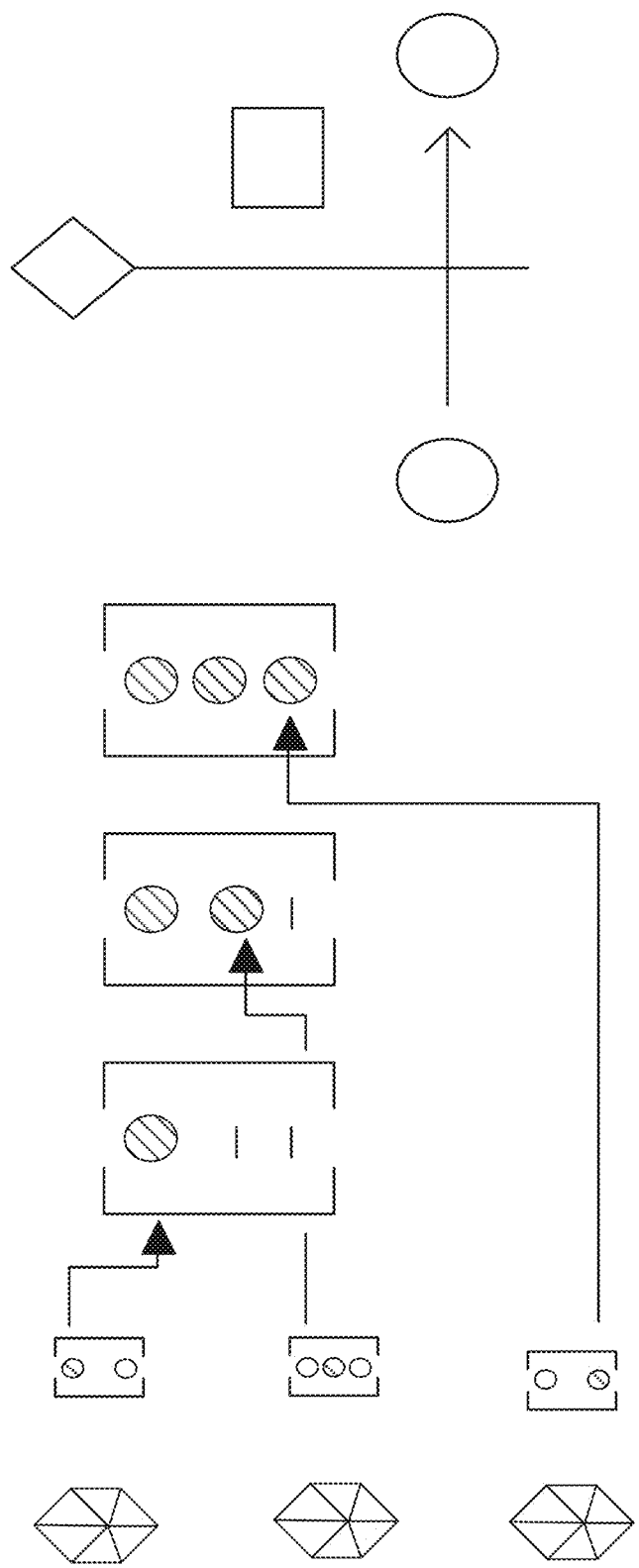
FIG. 20 shows basic principles underlying the formation of state contexts as basis for the contextualization of state transition activities, the validation of state contexts with respect to completeness of state coverage, and the trigger of a state transition activity upon operational co-existence of the state context states in the digital twin domain.

FIG. 20 shows further details underlying the formation of state contexts as basis for the contextualization of state transition activities, the validation of state contexts with respect to completeness of state coverage, and the trigger of a state transition activity upon operational co-existence of the state context states in the digital twin domain.

As shown in FIG. 20, the state machine activity can transit from a source state to a target state, preferably under the control condition that a pre-determined state transition condition is met.

As shown in FIG. 20, the control condition may be represented a state template used to represent a state context, wherein a state context reflects co-existence of a predetermined set of states in one or more state machine models across the digital domain.

It should be noted that according to the present invention the application of state contexts as a trigger for execution of state transition activities is optional such that also an empty state template is conceivable. Further, the definition of a state template is a matter of modelling the process domain and may vary with respect to a same state machine model for different applications thereof.

As shown in FIG. 20, an input template may have entry slots for at least one pre-determined state other than the source state. Once the pre-determined state reaches the status of active or equivalently is validated the related entry slot in the input template is marked.

Further, once all entry slots for the at least one pre-determined state other than the source state are marked the state transition from source state to target state is executed by the state transition activity. Thus, each state context forms a control flow triggering execution of a related state transition activity.

Overall, the present invention supports contextualized state transition activities where a state transition for one digital twin and one perspective thereon may be dependent from activation of a state with respect to the same or a different digital twin.

As explained in more detail in the following, the concept of input templates and related state contexts as a trigger for execution of state transition activities supports parallelization in event-driven process. The reason for this is that upon existence of a state context the related state transition activity may be executed immediately and in parallel to other state transition activities waiting for a state transition trigger.

Further, granularity of input templates may vary to increase or decrease the level of contextualization for a state transition activity in a state space model according to a specific application scenario.

Figure 21:
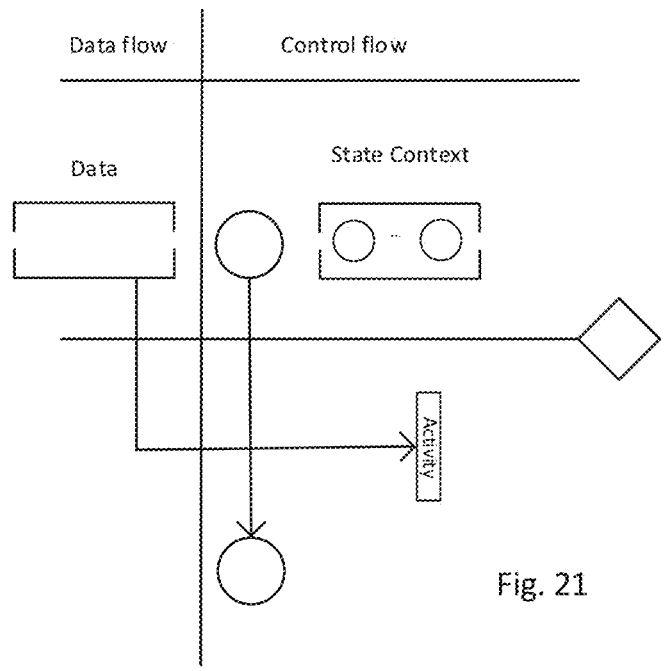
FIG. 21 shows the introduction of a control flow triggering the execution of a state transition activity and a data flow feeding a conditioning and data transformation process during execution of a state transition activity.

FIG. 21 shows the introduction of a control flow triggering the execution of a state transition activity and a data flow feeding a conditioning and data transformation process during execution of a state transition activity.

As shown in FIG. 21, a state transition activity may also have a data template to form a data flow underlying the execution the at least one state transition activity. If so, the activity execution module 42 is adapted to operate on data stored in the data template for transformation of data and for consideration of data-driven conditions during execution of the at least one state transition activity.

Figure 22:
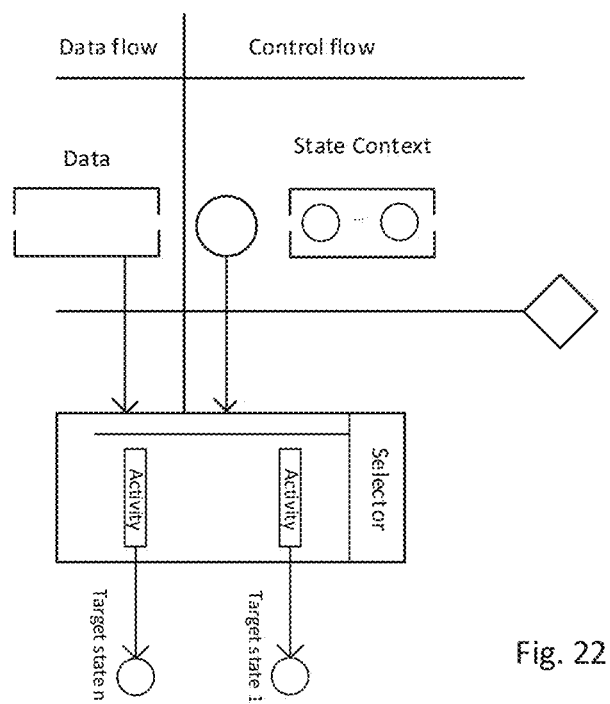
FIG. 22 shows the use of an activity group with respect to a state transition activity and the provision of a related state transition activity selector.

FIG. 22 shows the use of an activity group with respect to a state transition activity and the provision of a related state transition activity selector.

As shown in FIG. 22, the activity processing module 42 comprises an activity selector module adapted to select one state transition activity from a group of state transition activities as a function of conditional data in a data flow.

According to the present invention the provision of activity groups facilitates the handling of state machine models. Assuming that a state transition activity is operating on a same input constellation with respect to a source state but has different target states depending on the data flow then activity groups allow for a simplified modelling and execution of the state transition activity.

Figure 23:
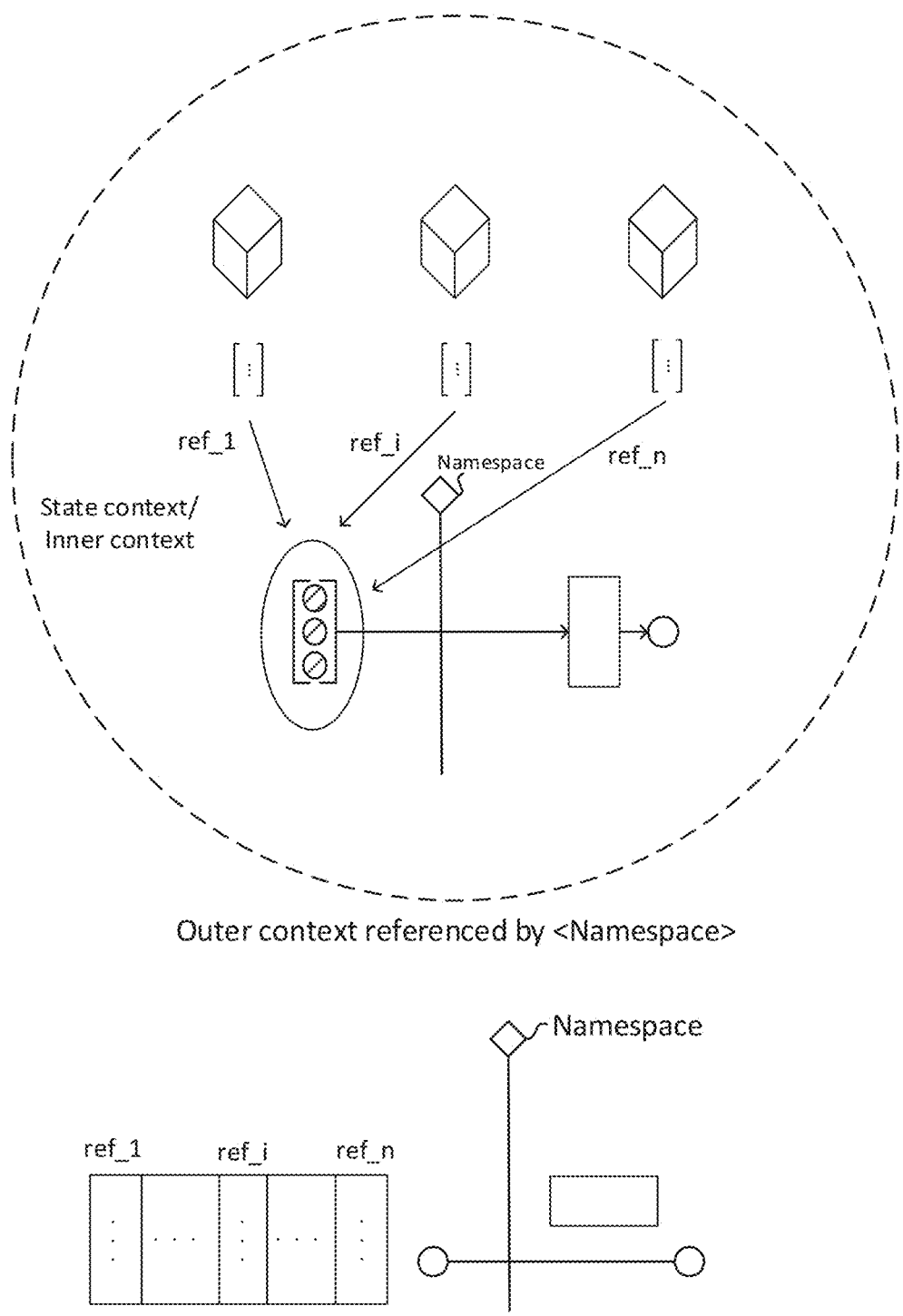
FIG. 23 shows the formation of embedded contexts from state contexts as inner contexts and the formation of outer contexts existing between digital twins, state transition activities and state contexts as basis for parallel execution of a single state transition activity for a plurality of different digital twins.

FIG. 23 shows the formation of embedded contexts from state contexts as inner contexts and the formation of outer contexts existing between digital twins, state transition activities and state contexts.

As already explained above, for the operation of digital twins it is necessary to effectively identify related state transition activities. It is also necessary to effectively access input templates of state transition activities for accelerated execution of even-driven process control.

To achieve this according to the present invention context references are formed from pairs of activity references and input template references, wherein each activity reference points to a state transition activity and each input template reference points to an input template which is stored in a state context store of the state transition activity. Context references are carried by states and digital twins. To interoperate digital twins must carry at least one identical context reference.

As shown in FIG. 23, one may assume without loss of generality that a state transition activity is executed with respect to a plurality of digital twins. Then, according to the present invention the related input templates are integrated into a context store, e.g., a matrix accumulating all input templates of a state transition activity referenced by a namespace.

As shown in FIG. 23, while the state context reflects an inner context for conditioning of a state activity transition, there also exists a necessity to establish a link between digital twins using inner contexts, related state transition activities and related inner contexts.

As shown in FIG. 23, according to the present invention it is suggested to use an outer context referenced by <Namespace>. The present invention uses an embedding of the inner context, a related state transition activity and of digital twins using the template of the inner context into an outer context such that during runtime a complete context reference is represented by a pair of activity reference and input template reference, e.g., as <Namespace>, ref_i.

In conclusion, according to the present invention contextualization on a specification of the outer contexts using <Namespace> in combination with a values, i.e. ref_1, . . .

, ref_n for access of a digital twin to its related state transition activities and its related relevant inner contexts.

Further, the concept of contextualization supports parallelization of execution of state transition activities which have independent access for different digital twins. Also, the use of contextualization avoids relational search for information and thus significantly accelerates the process of event-driven control.

Figure 24:
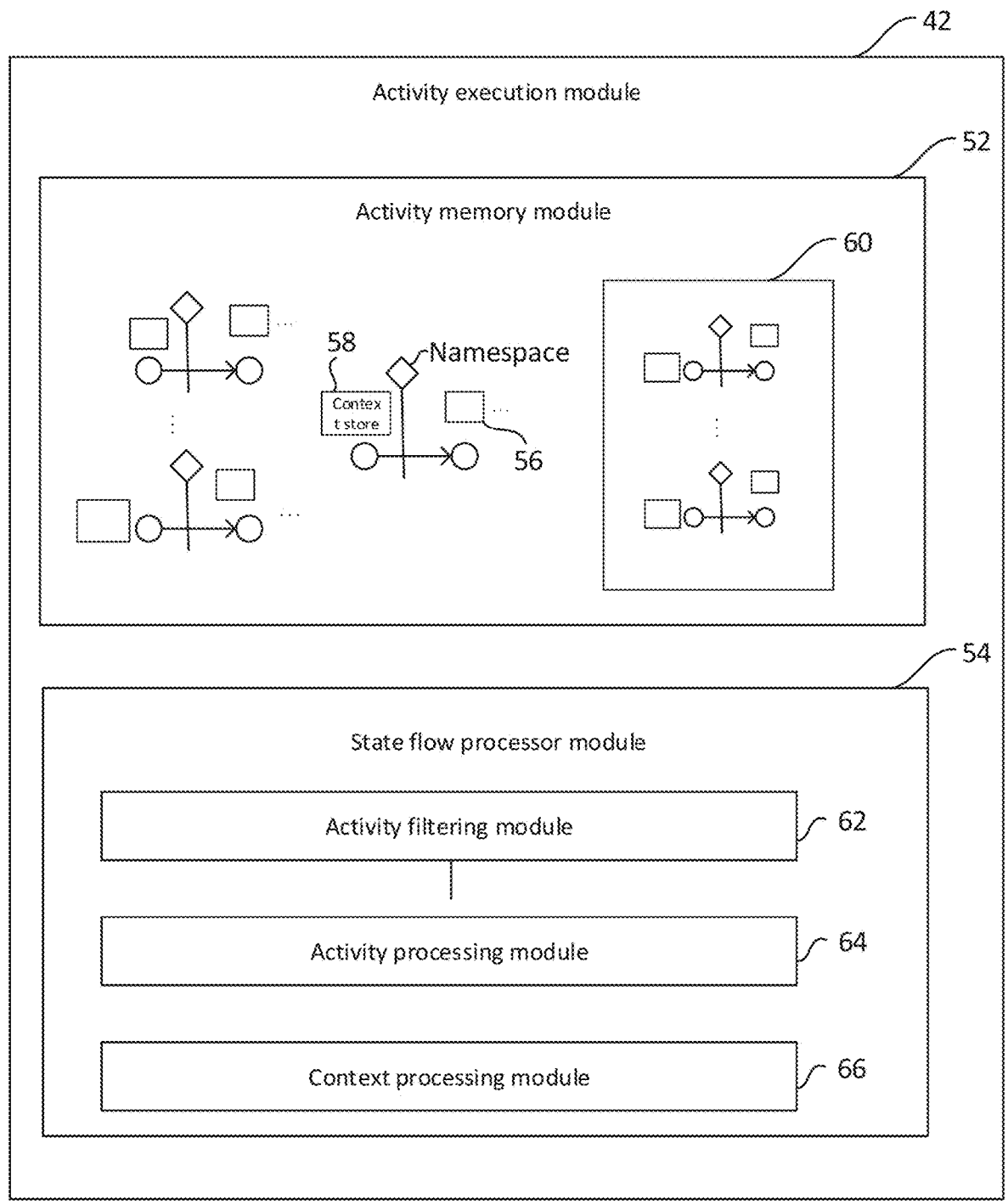
FIG. 24 shows a further detailed schematic diagram of the activity execution module as shown in FIG. 11.

FIG. 24 shows a further detailed schematic diagram of the activity execution module 42 as shown in FIG. 11.

As shown in FIG. 24, the activity execution module 42 comprises an activity memory module 52 adapted to store state transition activities.

As shown in FIG. 24, the activity execution module 42 comprises a state flow processer adapted to process state transition activities as triggered by the control flow and/or the data flow.

As shown in FIG. 24, the activity memory module 52 is adapted to store per state transition activity an activity operator 56 and a state context store 58. The state context store 58 is adapted to store all input templates referenced by the state transmission activity due to parallel execution of the state transition activity for multiple digital twins. Also, a plurality of state transition activities 60 may form a state transition activity group 60 by having assigned thereto a same <Namespace>.

As shown in FIG. 24, the state flow processor 54 comprises an activity filtering module 62 adapted to filter state transition activities of relevance for input states and adapted to filter input templates of filtered state transition activities being of relevance for input states.

As shown in FIG. 24, the state flow processor 54 comprises an activity processing module 64 adapted to execute state transition activities with respect to successfully validated updated input templates.

As shown in FIG. 24, the state flow processor 54 comprises a context processing module adapted to update filtered input templates in at least one state context store of at last one state transition activity to reflect the input of input states and to execute a validation of updated input templates with respect to completeness of coverage.

It should be noted that the context processing module 66 is adapted to prepare context store memories 58 prior to update of input templates. Here, every relevant context store memory 58 is checked to find out whether for requested context reference updates related input templates are already stored. If this is the case the context store memory 58 remains unchanged. If this is not the case the context processing module 66 will allocate additional memory in the context state memory 58 according to requested context reference updates.

Figure 25:
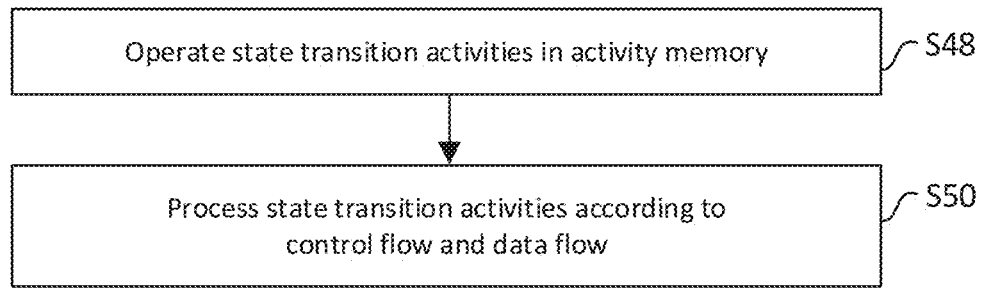
FIG. 25 shows a flowchart of operation for the activity execution module as shown in FIG. 24.

FIG. 25 shows a flowchart of operation for the activity execution module as shown in FIG. 24.

As shown in FIG. 25, in a step S48 executed by the activity memory module 52, state transition activities are operated in the activity memory module 52. This implies the deployment and update during runtime with respect to context references.

As shown in FIG. 25, in a step S50 executed by the state flow controller 54, state transition activities are processed according to control flow and data flow.

Figure 26:
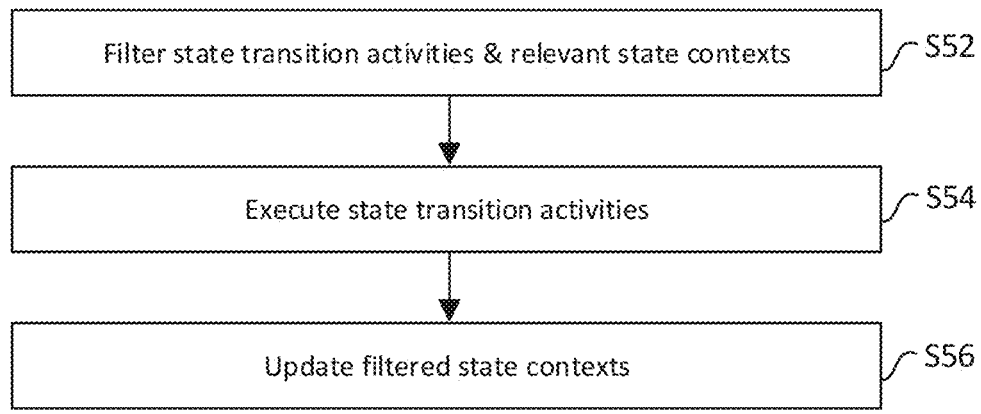
FIG. 26 shows a flowchart of operation for the state flow processor module as shown in FIG. 24.

FIG. 26 shows a flowchart of operation for the state flow processor module as shown in FIG. 24.

As shown in FIG. 26, in a step S52 executed by the activity filtering module 62, state transition activities of relevance for input states are filtered and then input templates of filtered state transition activities being of relevance for input states are filtered.

Preferably, state transition activities are filtered by comparing activity references of state transition activities with activity references carried by input states. Further, filter input templates are filtered by comparing input template references assigned to input templates with input template references carried by input states.

As shown in FIG. 26, in a step S54 executed by the activity processing module 64, state transition activities are executed with respect to successfully validated updated input templates.

As shown in FIG. 26, in a step S56 executed by the context processing module 66, filtered input templates in state context stores 58 are updated to reflect the input of input states. This is achieved by cancelling entries representing invalidated states in related input templates and by entering entries representing validated states in related input templates.

Figure 27:
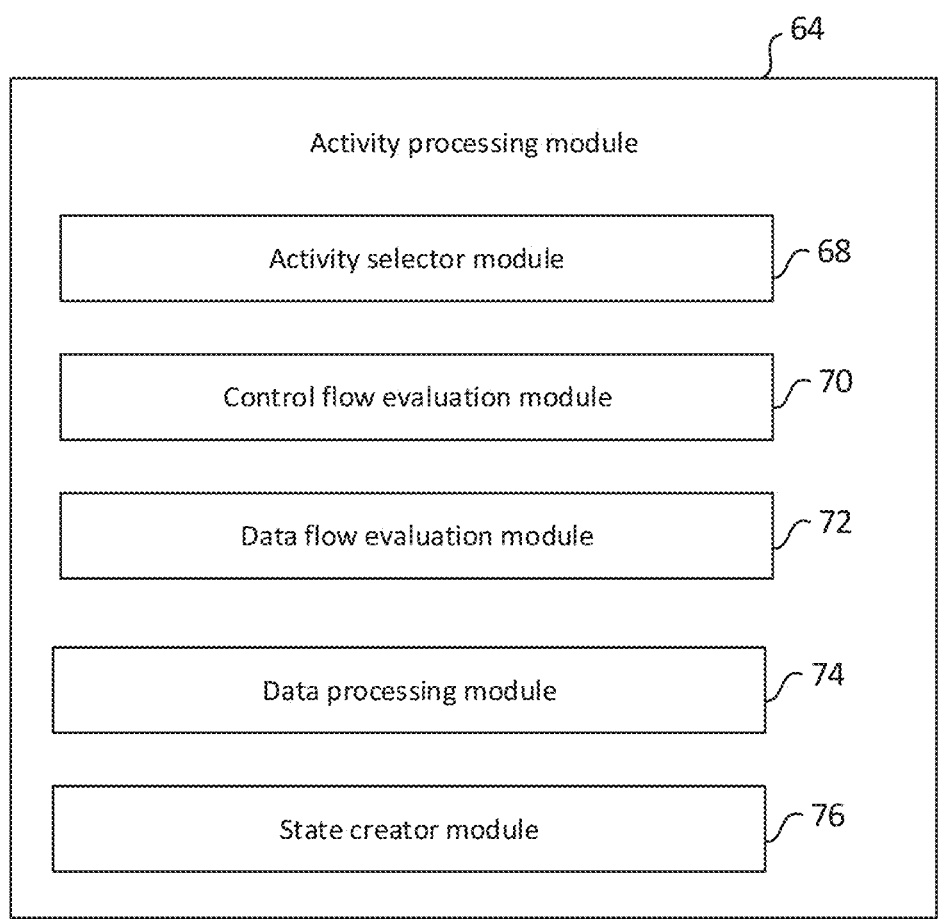
FIG. 27 shows a further detailed schematic diagram of the activity processing module as shown in FIG. 24.

FIG. 27 shows a further detailed schematic diagram of the activity processing module 64 as shown in FIG. 24.

As shown in FIG. 27, the activity processing module 64 comprises an activity selector module 68 adapted to select one state transition activity from a group of state transition activities as a function of conditional data in a data flow.

As shown in FIG. 27, the activity processing module 64 comprises a control flow evaluation module 70 adapted to evaluate whether a control flow as represented by an input template triggers an execution of a state transition.

As shown in FIG. 27, the activity processing module 64 comprises a data flow evaluation module 72 adapted to evaluate whether at least one condition as represented by a data flow triggers an execution of a state transition.

As shown in FIG. 27, the activity processing module 64 comprises data processing unit adapted to execute a data transformation of data in the data flow into state data for assignment to the target state.

As shown in FIG. 27, the activity processing module 64 comprises a state creator module 76 adapted to create a target state according to a state scheme representing data elements in relation to the target state and according to data as processed by the data processing module.

Preferably, state creator module 76 is adapted to allocate state memory in the digital twin memory module according to the state scheme, to create at least one context reference for assignment to the target state and to store data in relation to the target state in the allocated state memory.

Figure 28:
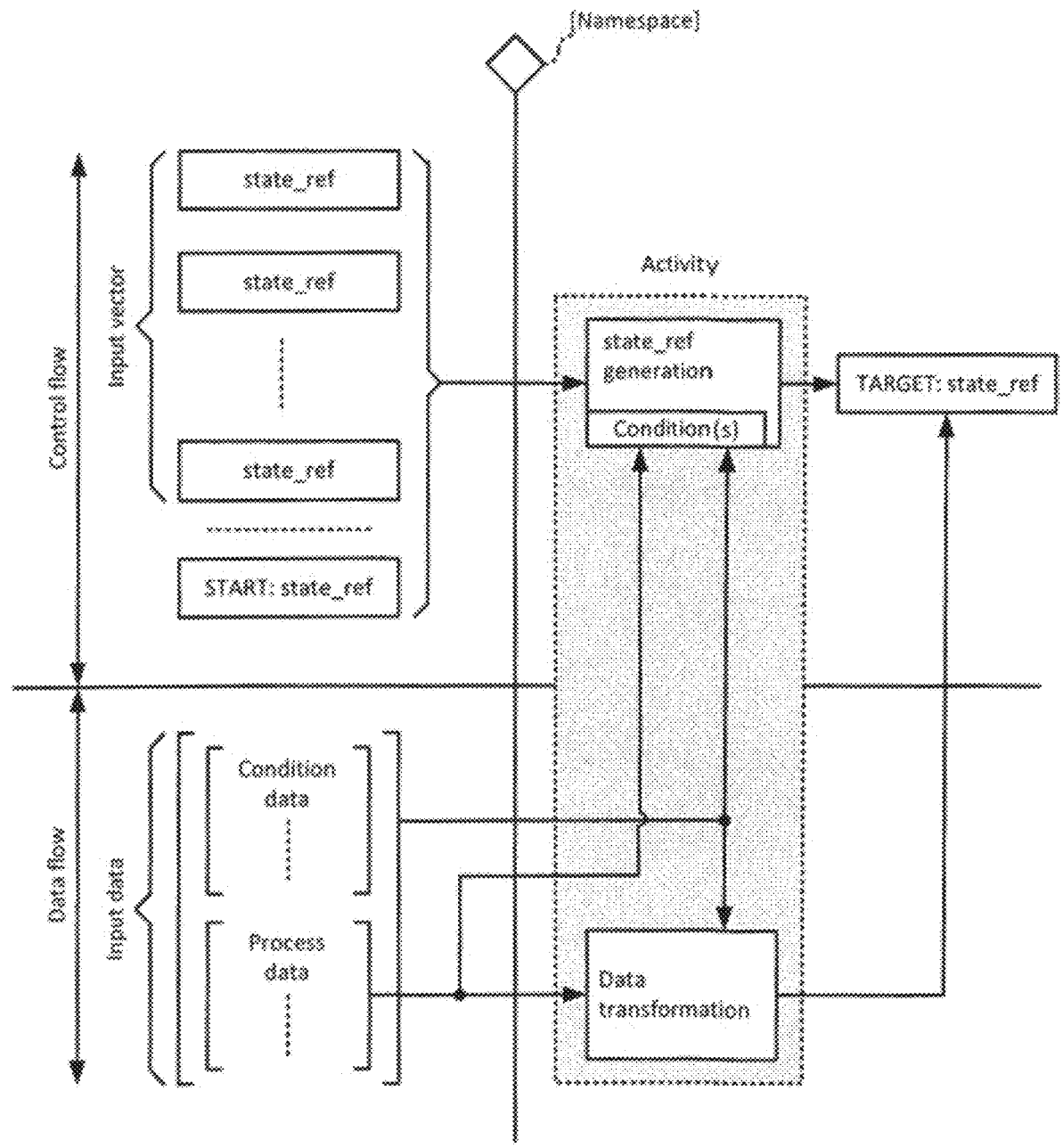
FIG. 28 shows a detailed representation of a control flow triggering the execution of a state transition activity in operative combination with a data flow feeding a conditioning and data transformation process during execution of a state transition activity.

FIG. 28 shows a detailed representation of a control flow triggering the execution of a state transition activity in operative combination with a data flow supplying data for a conditioning of a state transition process and for execution of a data transformation process.

As shown in FIG. 28, any input to a state transition activity at least comprises a control flow and optionally a data flow. Here, a control flow is specified as state context. A state context is represented by an input template or input vector which is specified by references to states modelled in the state machine model prior to execution of the state transition activities.

As outlined above with respect to FIG. 20, during runtime of the state transition activity the related entries in the input template will be updated upon creation of states having a matching reference to the state indicated in the input template.

As shown in FIG. 28, the data flow is also represented by an input template which divides in two types of data, i.e. data representing conditions for execution of state transition activity and data which a supplied to a data transformation process.

As shown in FIG. 28, any state transition activity has an activity operator realizing the generation of the target state with a reference to a state scheme as explained above with reference to FIG. 9.

As shown in FIG. 28, an activity operator may implement a data transformation logic within the framework of the state transition activity. Here, e.g., data transformation may be related to modification of process data to be in line with the specification of the target state.

As indicated above, according to the present invention the activity operator may also realize control logic and related functionality which empowers a digital twin with active control capabilities having impact on process entities in the process domain. According to the present invention a digital twin is not only a functional unit gathering data from a process domain actively executes control logic for process entities in the process domain.

Figure 29:
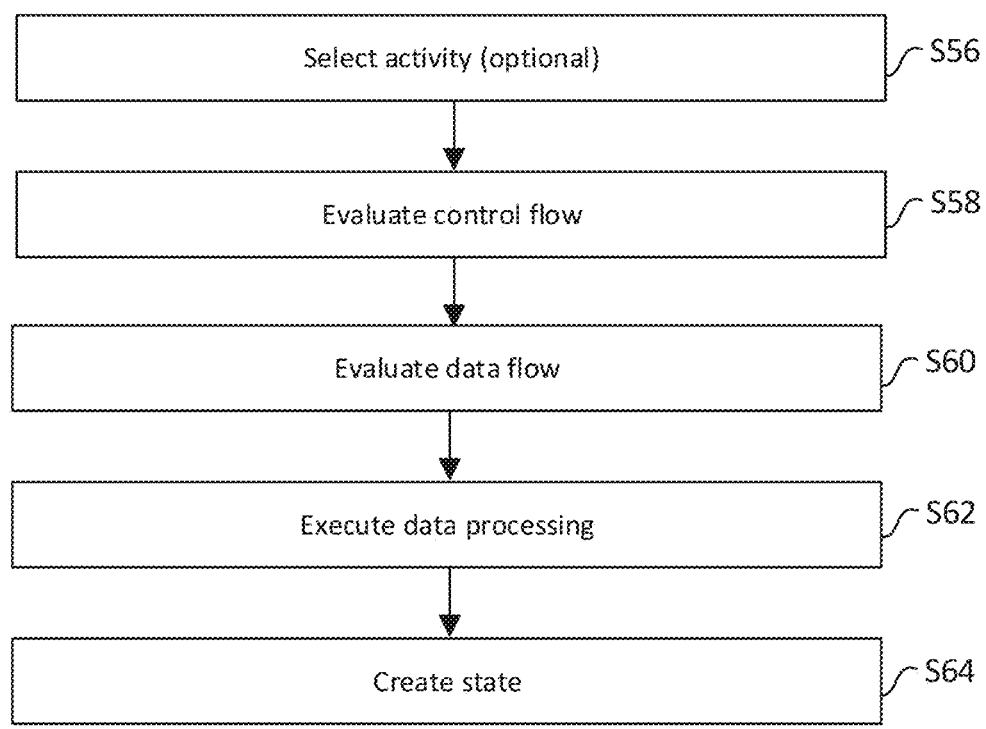
FIG. 29 shows a flowchart of operation of the activity processing module as shown in FIG. 27 applying the control flow and data flow architecture as shown in FIG. 28.

FIG. 29 shows a flowchart of operation of the activity processing module as shown in FIG. 27 applying the control flow and data flow architecture as shown in FIG. 28.

As shown in FIG. 29, in a step S56 executed by the activity selector module 68, there is selected one state transition activity from a group of state transition activities as a function of conditional data in a data flow. It should be noted that this step S56 is optional and depends on the configuration of the state transition activity.

As shown in FIG. 29, in a step S58 executed by the control flow evaluation module 70, there is evaluated whether a control flow as represented by an input template triggers an execution of a state transition.

As shown in FIG. 29, in a step S60 executed by the data flow evaluation module 72 there is evaluated whether at least one condition as represented by a data flow triggers an execution of a state transition.

As shown in FIG. 29, in a step S62 executed by the data processing unit 74, there is executed a data transformation of data in the data flow into state data for assignment to the target state.

According to the present invention the data processing in step S62 may implement a control logic for generation of a control command for control of at least one process entity in the process domain. Preferably, the control command may be generated using persistent data available from the digital twin operating the data processing module and using event data describing process domain dynamics.

As shown in FIG. 29, in a step S64 executed by the state creator module 76, there is created a state according to a state scheme representing data elements in relation to the target state and according to data as processed by the data processing module. This is achieved by allocating state memory in the digital twin memory module according to the applying state scheme, by creating context references for assignment to the target state and by storing data in relation to the target state in the allocated state memory.

It should be noted that an alternative to the creation of a new state could be the update of an existing data with data made available through an input state when the data made available does not lead to a change of a valid state in a relevant state machine model, i.e. if the valid state is maintained and only operative data in relation thereto changes.

Figure 30:
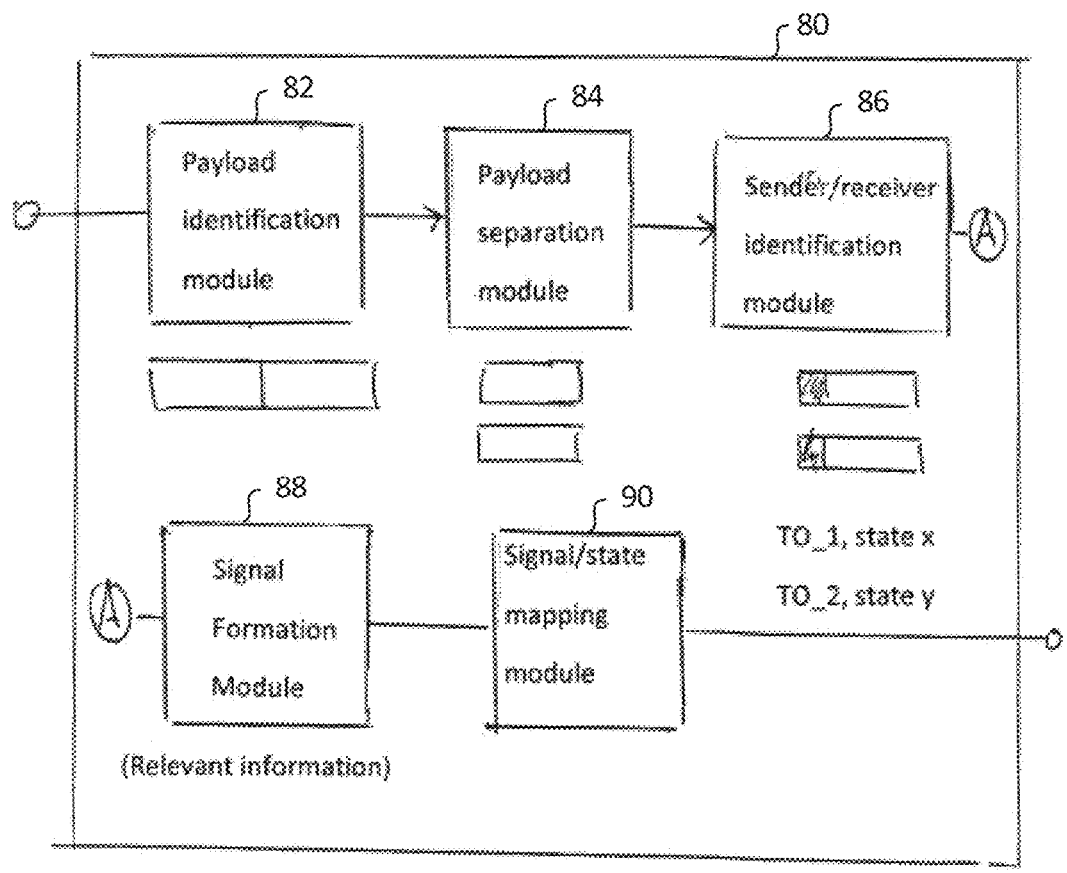
FIG. 30 shows a schematic diagram of an inbound process interface forming part of the inbound interface as shown in FIG. 7 and an inbound processing line operated in the inbound process interface.

FIG. 30 shows a schematic diagram of an inbound process interface forming part of the inbound interface 20 as shown in FIG. 7 and an inbound processing line operated in the inbound process interface.

As shown in FIG. 30, inbound interface 20 comprises an inbound process interface comprising at least one communication endpoint 78-1, . . . , 78-n adapted to terminate a communication channel established between a process entity and the inbound interface according to a predetermined communication protocol.

As shown in FIG. 30, inbound interface 20 comprises at least one inbound processing line 80-1, . . . , 80-n adapted to analyze payload data received at the communication endpoint and to transform relevant payload data into at least one input state for output to the inbound buffer.

It should be noted that according to the present invention one inbound process interface is operated per pair of process entity and related input state for parallel asynchronous communication of event data from the process domain to the digital twin domain.

As shown in FIG. 30, the inbound processing line 80 comprises a payload identification module 82 adapted to identify payload data carried by communication data received at the communication endpoint.

As shown in FIG. 30, the inbound processing line 80 comprises a payload separation module 84 adapted to separate payload data into at least one payload item to be forwarded to the digital twin domain.

As shown in FIG. 30, the inbound processing line 80 comprises a sender/receiver identification module 86 adapted to identify a pair of process entity and digital twin object as sender and receiver of every payload item.

As shown in FIG. 30, the inbound processing line 80 comprises a signal forming module adapted to form a signal per payload item which represents information which is relevant for processing in digital twin domain.

As shown in FIG. 30, the inbound processing line 80 comprises a signal state mapping module 90 adapted to map the signal onto an input state carrying the information represented by the signal and to execute a data transformation with respect to the payload item. The input state may be forwarded to the service controller system 10 through an inbound communication port adapted to forward the input state to a corresponding inbound buffer.

Figure 31:
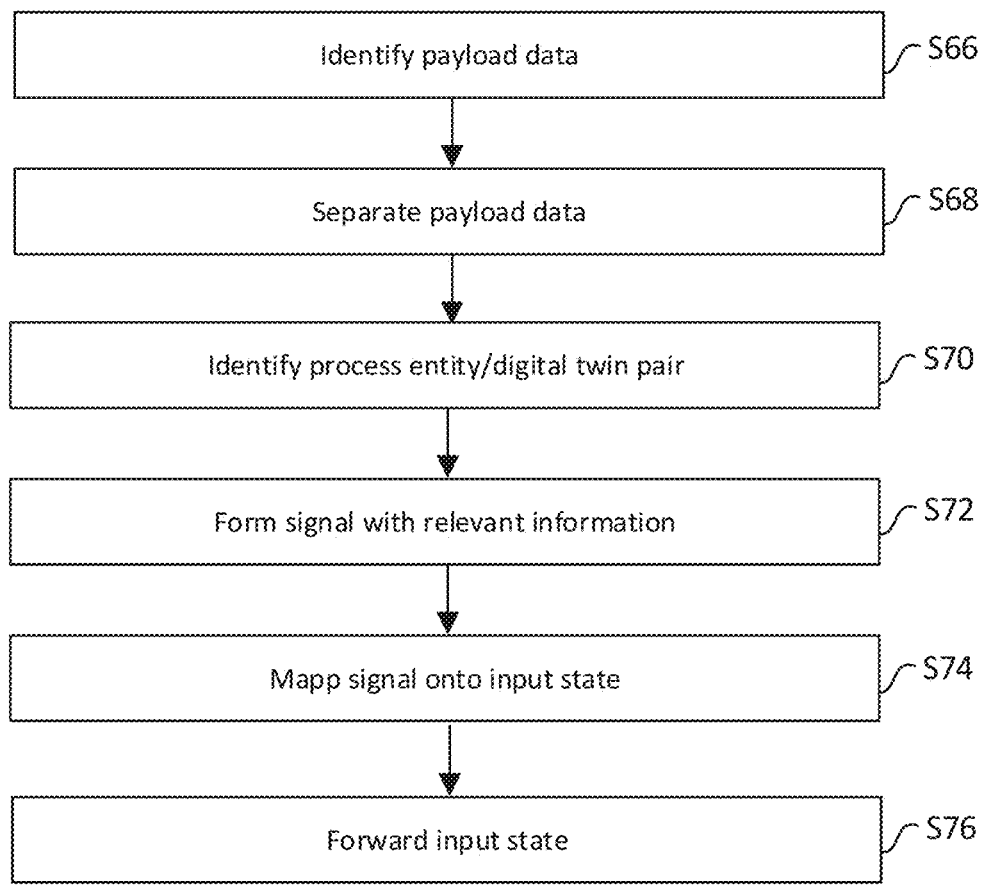
FIG. 31 shows a flowchart of operation for the inbound processing line as shown in FIG. 30.

FIG. 31 shows a flowchart of operation for the inbound processing line as shown in FIG. 30.

As shown in FIG. 31, in a step S66 executed by the payload identification module 82, there is identified payload data carried by communication data received at the communication endpoint.

As shown in FIG. 31, in a step S68 executed by the payload separation module 84, payload data is separated into at least one payload item to be forwarded to the digital twin domain.

As shown in FIG. 31, in a step S70 executed by the sender/receiver identification module 86, there is identified a pair of process entity and digital twin object as sender and receiver of every payload item.

As shown in FIG. 31, in a step S72 executed by the signal forming module 88, a signal per payload item is formed which represents information which is relevant for processing in digital twin domain.

As shown in FIG. 31, in a step S74 executed by the signal state mapping module 90 there is executed a mapping of the signal onto an input state carrying the information represented by the signal. Step 74 optionally serves to execute a data transformation with respect to the payload item. In a step S76 the input state is forwarded to the inbound buffer 22 via a related inbound communication port.

Figure 32:
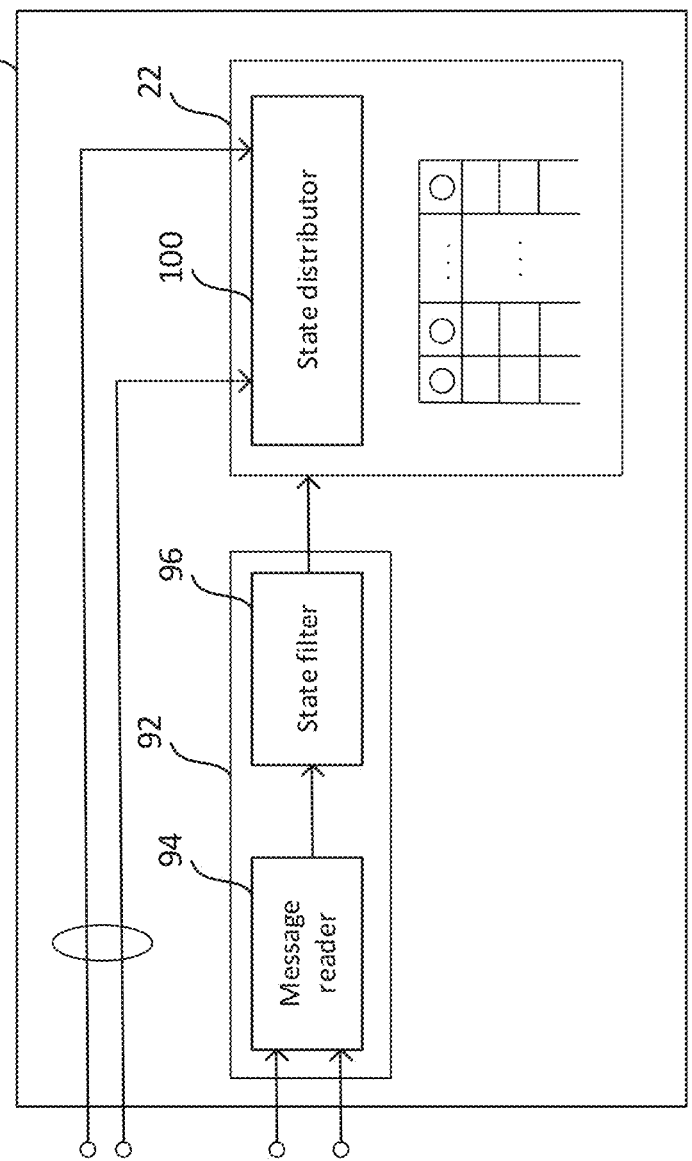
FIG. 32 shows a schematic diagram of an inbound service interface forming part of the inbound interface as shown in FIG. 7 and a schematic diagram of the inbound buffer as shown in FIG. 7.

FIG. 32 shows a schematic diagram of an inbound service interface 92 forming part of the inbound interface 20 as shown in FIG. 7 and a schematic diagram of the inbound buffer as shown in FIG. 7.

Generally, the inbound service interface 92 is adapted to read at least one messaging communication channel for receipt of state messages as generated by the model-based process controller of the controller service module or by a model-based process controller of at least one further controller service module operated in the digital twin domain.

As shown in FIG. 32, the inbound service interface 92 comprises a state message reader adapted to read state messages exchanged on the at least one messaging communication channel.

As shown in FIG. 32, the inbound service interface 92 comprises a state filter 96 adapted to filter state messages to be processed by the controller service module.

As shown in FIG. 32, the inbound buffer 22 comprises a process cycle line 98 adapted to store input states in an order according to type of state. According to present invention the process cycle line 98 may be a linear memory line or a line of queues arranged in adjacency.

As shown in FIG. 32, the inbound buffer 22 comprises a state distributor 100 adapted to check whether a type of a next input state is identical to a type of state stored in the process cycle line at an entry position and to update the process cycle line accordingly.

Figure 33:
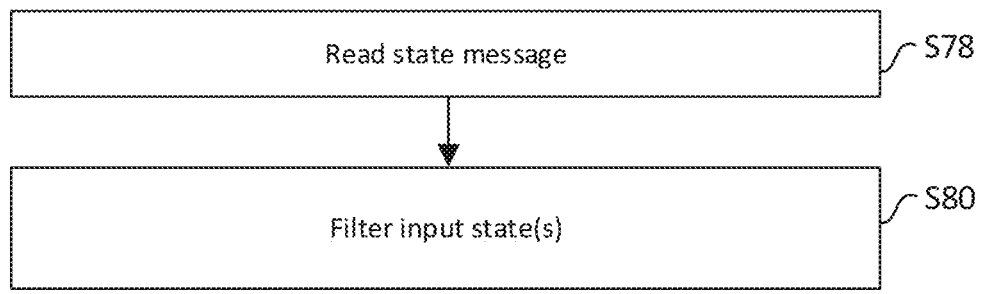
FIG. 33 shows a flowchart of operation for the inbound service interface as shown in FIG. 32.

FIG. 33 shows a flowchart of operation for the inbound service interface as shown in FIG. 32.

As shown in FIG. 33, in a step S78 executed by the state message reader 94, there is executed a reading of state messages exchanged on the at least one messaging communication channel.

Preferably, the state message reader 94 reads at least one messaging communication channel for receipt of state messages as generated by the model-based process controllers 18 in the service controller system 10.

Preferably, the state message reader 94 reads a plurality of messaging communication channels setup for exchange of state messages carrying states having a dedicated state type.

As shown in FIG. 33, in a state S80 executed by the state filter 96, there is executed a filtering of state messages to be processed by the controller service module.

Figure 34:
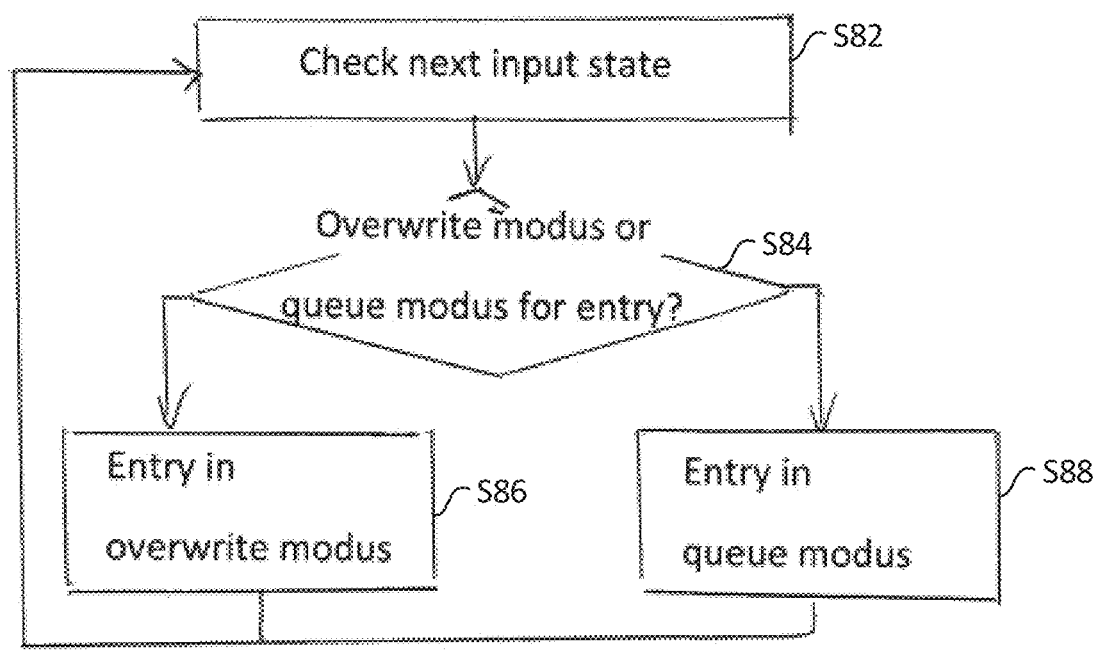
FIG. 34 shows a flowchart of operation for a state distributor operated in the inbound buffer as shown in FIG. 32.

FIG. 34 shows a flowchart of operation for a state distributor operated in the inbound buffer as shown in FIG. 32.

As shown in FIG. 34, in a step S82 executed by the state distributor 100, there is executed a check whether a type of a next input state is identical to a type of state stored in the process cycle line at an entry position and to update the process cycle line 98 accordingly.

As shown in FIG. 34, in a step S84 executed by the state distributor 100, there is executed a check whether an entry modus for the next input state is an overwrite modus or a state queue modus.

As shown in FIG. 34, in a step S86 executed by the state distributor 100, when the entry modus is the overwrite modus there is executed a step S86 to overwrite the process cycle line 98 at an entry position with a next input state when the type of the next input state and a type of an input state pre-stored at the entry position are identical.

As shown in FIG. 34, in a step S88 executed by the state distributor 100, when the entry modus is the queue modus there is executed a step S88 to store a next input state in a related state queue of the process cycle line. When there is already activated a state queue for the type of the next input state then the next input state is distributed to the corresponding state queue. Otherwise, when the type of the next input state is different form the types of all pre-stored input states the next input state is stored in a newly activated state queue.

Figure 35:
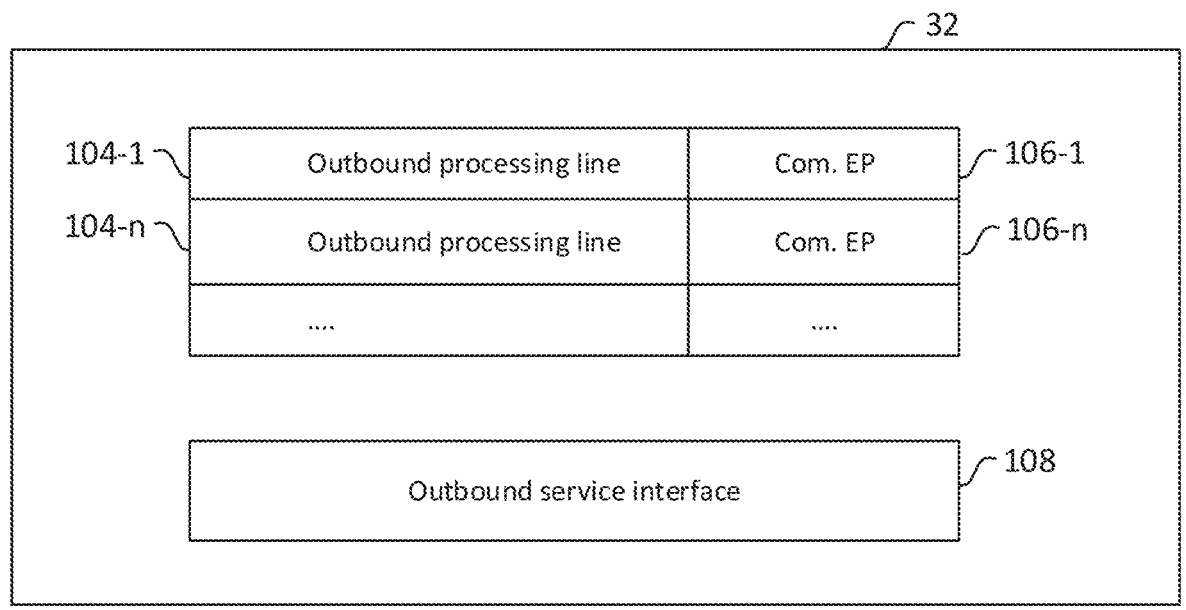
FIG. 35 shows a schematic diagram of an outbound process interface forming part of the outbound interface as shown in FIG. 7.

FIG. 35 shows a schematic diagram of an outbound process interface 102 forming part of the outbound interface 32 as shown in FIG. 7.

As shown in FIG. 35. the outbound process interface 102 comprises at least one outbound processing line 104-1, . . . , 104-n adapted to receive an output state representing a control command and to transform relevant control information into at least one payload datum for output to a process entity in the process domain.

According to the present invention one outbound process interface may be operated per pair of output state and related at least one controlled process entity for parallel asynchronous communication of control commands from the digital twin domain to the process domain.

As shown in FIG. 35, the outbound process interface 102 comprises at least one at least one outbound communication end point 106-1, . . . , 106-n adapted to output a communication signal which carries information being relevant for control of operation in the process domain.

As shown in FIG. 35, the outbound interface 32 comprises an outbound service interface adapted to write to at least one messaging communication channel for forwarding of state messages as generated in the model-based process controller.

Figure 36:
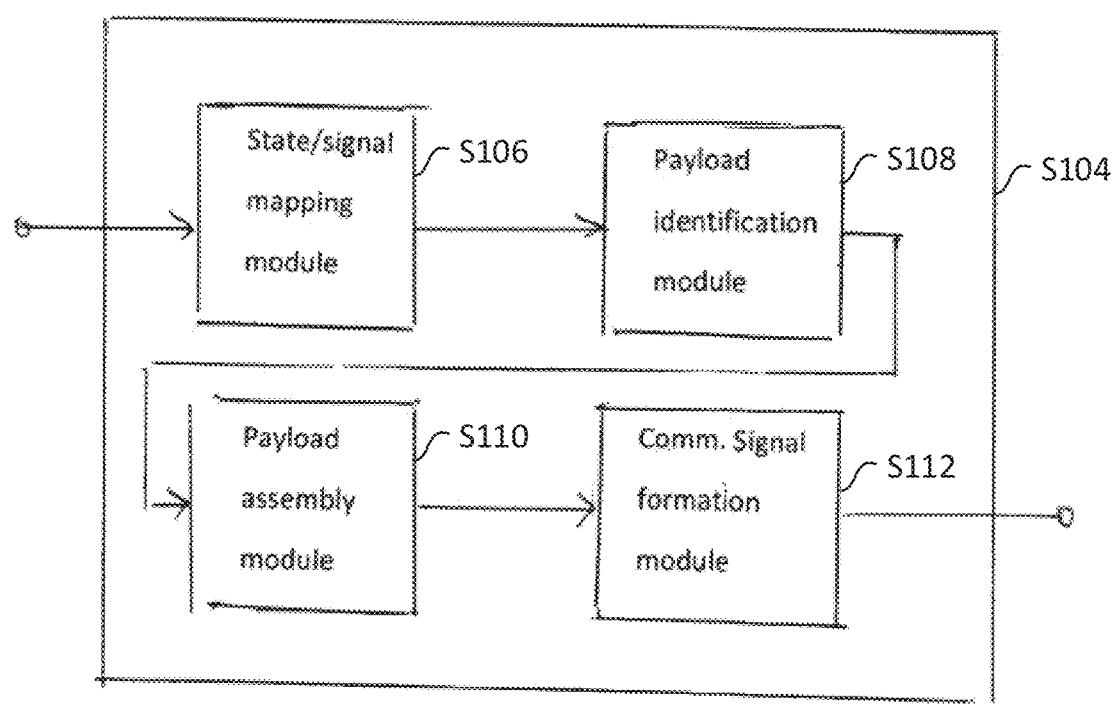
FIG. 36 shows a schematic diagram of an outbound processing line forming part of the outbound process interface as shown in FIG. 35.

FIG. 36 shows a schematic diagram of an outbound processing line 104 forming part of the outbound process interface as shown in FIG. 35.

As shown in FIG. 36, the outbound processing line 104 comprises a state signal mapping module 106 adapted to map the output state onto a signal carrying the information represented by the output state and to execute a related data transformation. The state signal mapping module 106 may also be adapted to execute a data transformation.

As shown in FIG. 36, the outbound processing line 104 comprises a payload identification module 108 adapted to identify payload data carried by the signal carrying the information represented by the output state.

As shown in FIG. 36, the outbound processing line 104 comprises a payload assembly module 110 adapted to assemble the payload data into at least one payload item.

As shown in FIG. 36, the outbound processing line 104 comprises a communication signal forming module 112 adapted to form a communication signal representing at least one payload item and related receiver for output to a communication end point.

Figure 37:
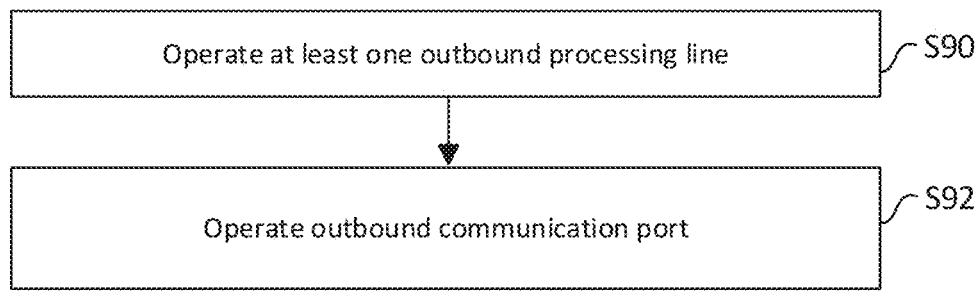
FIG. 37 shows a flowchart of operation for the outbound process interface as shown in FIG. 35.

FIG. 37 shows a flowchart of operation for the outbound process interface as shown in FIG. 35.

As shown in FIG. 37, in a step S90 executed by the outbound processing line 104, there is received an output state representing a control command which is transformed into relevant control information into at least one payload datum for output to a process entity in the process domain. During transformation an data transformation is applicable as well.

As shown in FIG. 37, in a step S92 executed by the outbound communication port 106 there is output a communication signal which carries information being relevant for control of operation in the process domain.

Figure 38:
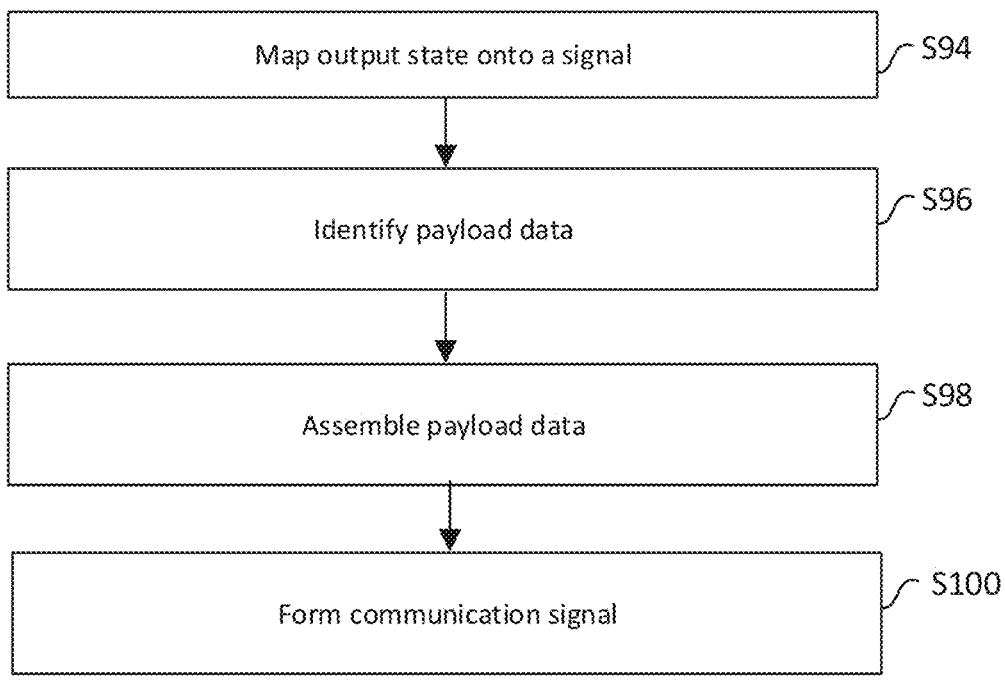
FIG. 38 shows a flowchart of operation for the outbound processing line as shown in FIG. 36.

FIG. 38 shows a flowchart of operation for the outbound processing line as shown in FIG. 36.

As shown in FIG. 38, in a step S94 executed by the state signal mapping module 106, there is executed a mapping of the output state onto a signal carrying the information represented by the output state. During the mapping process also an appropriate data transformation may apply.

As shown in FIG. 38, in a step S96 executed by the payload identification module 108, there is identified payload data carried by the signal carrying the information represented by the output state.

As shown in FIG. 38, in a step S98 executed by the payload assembly module 110, there executed an assembly of the payload data into at least one payload item, As shown in FIG. 38, in a step S100 executed by the communication signal forming module 112, there is formed a communication signal representing at least one payload item and related receiver for output to a communication end point.

Figure 39:
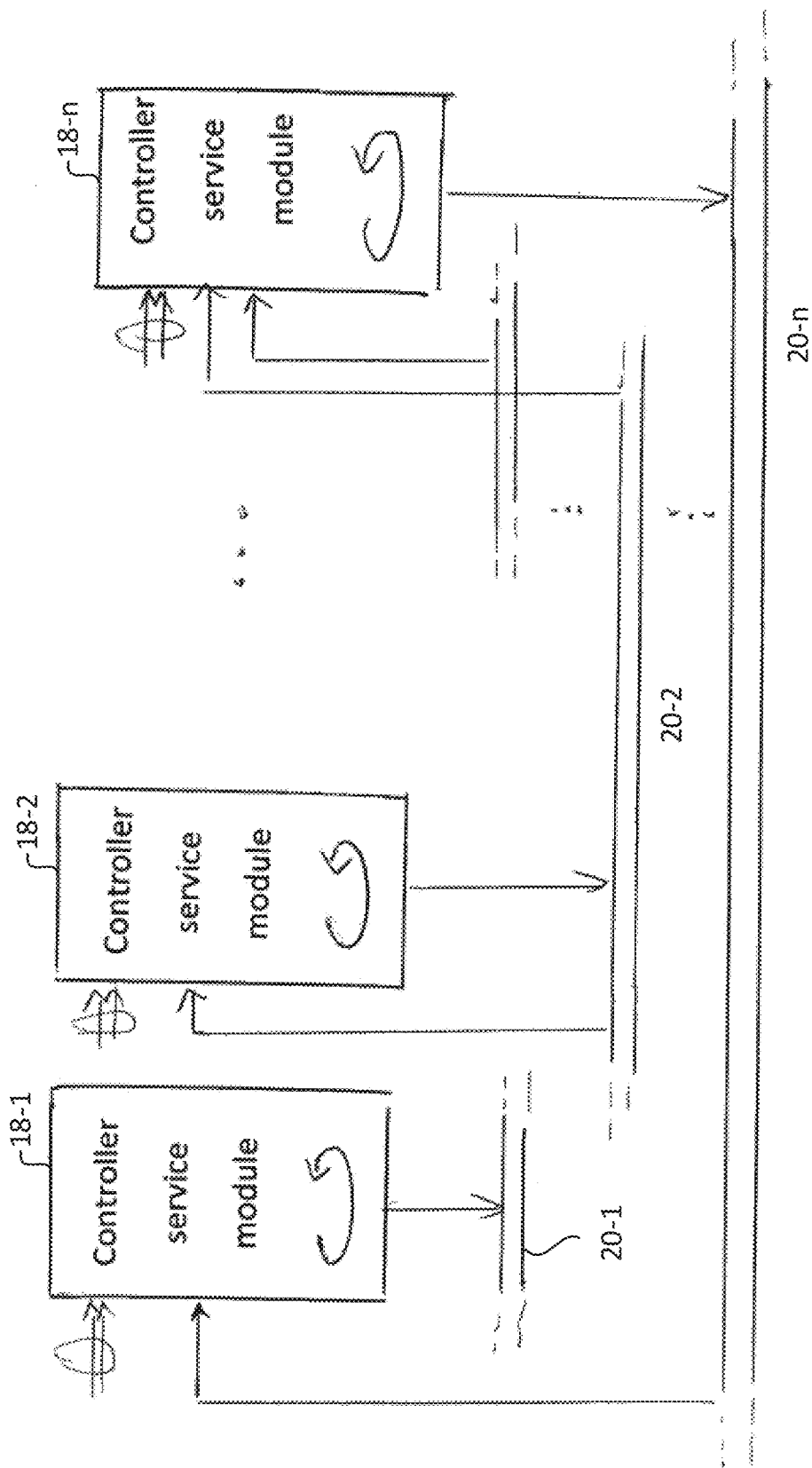
FIG. 39 shows a routing topology for loosely coupling of control service modules cooperating in a control service system as shown in FIG. 5.

FIG. 39 shows a routing topology for loosely coupling of control service modules cooperating in a controller service system as shown in FIG. 5.

As shown in FIG. 39, the controller service system 10 implementing the event-driven process control according to the present invention comprises a plurality of controller service modules 18-1, . . . , 18-n according to the present invention.

According to the present invention each digital twin representing a process entity is assigned to exactly one controller service module 18 for execution thereof. This assures data integrity and according to the concept of single point of truth.

As shown in FIG. 39, the controller service system 10 comprises at least one messaging communication channel 20-1, . . . , 20-n per controller service module for loosely coupling the at least controller service module through exchange of state messages over at least one messaging communication channel 20-1, . . . , 20-n connecting the at least one controller service module 18-1, . . . , 18-n.

It should be noted that for the case of a single controller service module state messages serve for feedback of the output of the single controller service module to its related inbound interface.

It should be noted that according to the present invention state messages may carry event data as created in the process domain and as received by a controller service module for distribution of the event data to a plurality of controller service module 18-1, . . . , 18-n in the digital twin domain.

Figure 40:
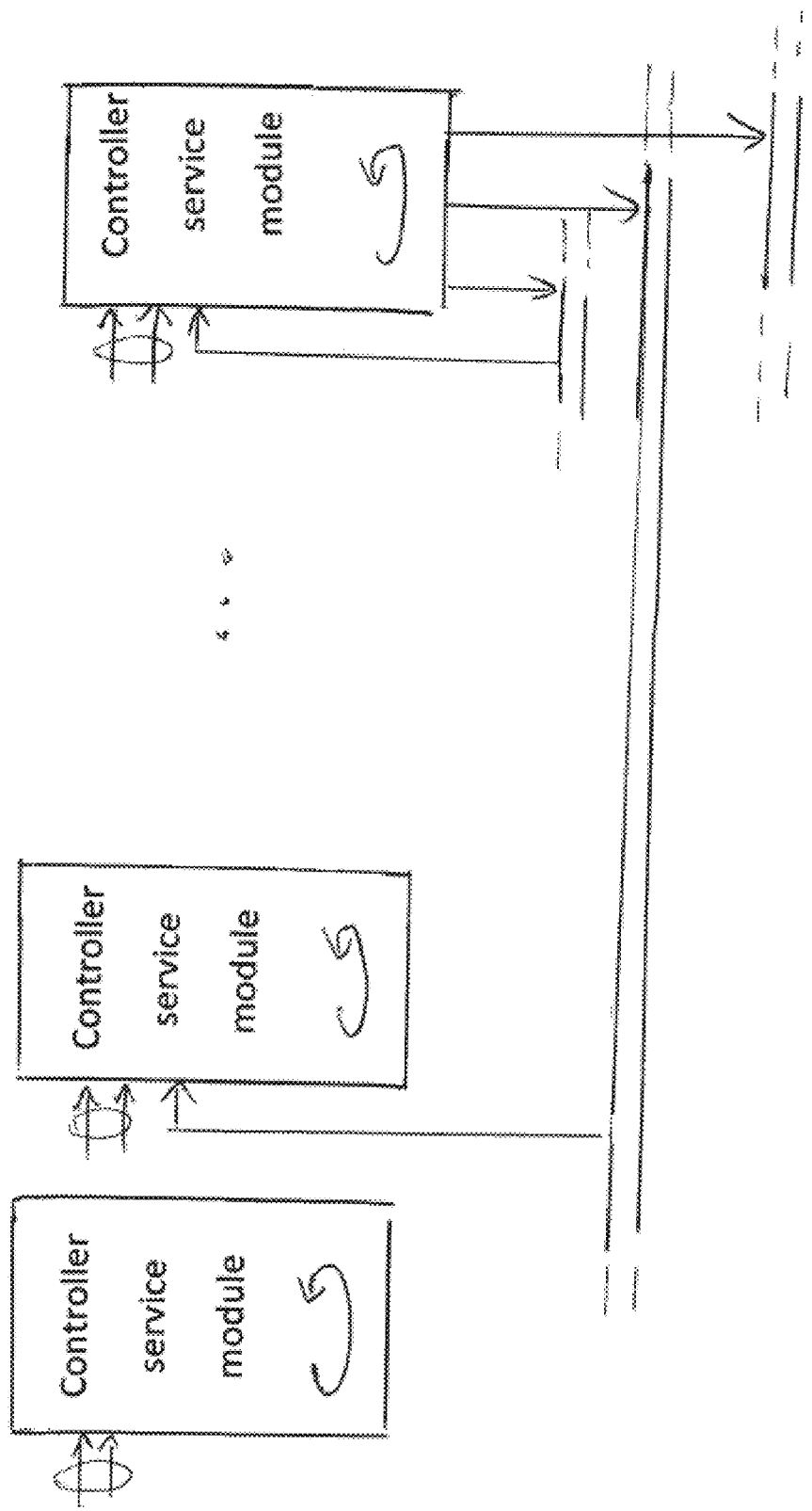
FIG. 40 shows a routing topology for loosely coupling of control service modules cooperating in a control service system as shown in FIG. 5.

FIG. 40 shows a modification of the controller service system shown in FIG. 39.

As shown in FIG. 40, at least one messaging communication channel is provided per controller service module 18-1, . . . , 18-n for exchange of state messages carrying state information. Here, messaging communication channels are set up for exchange of state messages in relation to states having dedicated characteristics which reduces processing load on the input side of the controller service modules 18-1, . . . , 18-n.

As shown in FIG. 40, as an example a first messaging communication channel may be set up for receipt of messages in relation to internal states as generated by the model-based process controller of a specific controller service module 18 to feedback states created in a service controller module 18 to the same service controller 18. A second messaging communication channel may be set up for receipt of messages in relation to external states as generated outside a controller service module 18. A third messaging communication sub-channel for receipt messages in relation to states carrying information in relation to digital twin updates.

According to the present invention the number of set-up communication channels may be selected freely and only depends on the routing topology selected for an architecture of a controller service system.

While in the above, the present invention has been described with reference to the drawings and figures of preferred embodiments of the invention, it should be noted that clearly the present invention may also be implemented using variations and modifications thereof which will be apparent and can be readily made by those skilled in the art without departing from the scope and spirit of the present invention. E.g., functionalities described above may be realized in software, in hardware, or a combination thereof.

Accordingly, it is not intended that the scope of claims appended hereto is limited to the description as set forth herein, but rather that the claims should be construed to encompass all features of presentable novelty that preside in the present invention, including all features that would be treated as equivalent thereof by those skilled in the art to which the present invention pertains.

The invention claimed is:

1. Controller service module running an event-driven control process in a digital twin domain for control of process entities operated in a process domain, wherein in the digital twin domain the behavior of process entities is modeled through execution of state machine models, the controller service module comprising: a memory;
    an inbound interface adapted to asynchronously receive event data created with respect to process entities in the process domain and/or event data created through execution of state machine models in the digital twin domain;
    an inbound buffer adapted to distribute received event data to a process cycle buffer such that every distributed event datum is represented as an input state according to an instance of a state in a relevant state machine model that maps to the event datum;
    a model-based process controller adapted to read at least one input state from the process cycle buffer in processing cycles and to control selected process entities by operating
    a state machine execution module adapted to operate at least one relevant state machine model to reflect the input of at least one input state such that the state machine model can transit from at least one source state to at least one target state through execution of at least one state transition activity under the condition that a pre-determined state transition condition is met, wherein the state transition condition models a state context reflecting a co-existence of a pre-determined set of states in one or more state machine models across the digital domain during run time; and
    a process control module adapted to check whether the operation of the at least one relevant state machine model triggers generation of an external control command to instruct an external control operation in the process domain; and
    an outbound interface adapted to output every generated external control command to at least one process entity processing the external control command.

2. Controller service module according to claim 1, wherein the state machine execution module comprises a digital twin execution module adapted to operate at least one digital twin in a digital twin domain and in relation to at least one selected process entity, wherein the at least one digital twin embeds control logic for the at least one process entity, ingests operational data of the at least one selected process entity and references at least one state machine model to represent the behavior of the at least one selected process entity for observation and/or control thereof.

3. Controller service module according to claim 2, wherein the digital twin execution module comprises a digital twin memory module adapted to store operative data for processing of the at least one digital twin in real time, wherein operative data is related to representation of the at least one digital twin, to representation of at least one state machine model as referenced by the at least one digital twin, and/or to representation of control logic embedded into the at least one digital twin.

4. Controller service module according to claim 2, wherein the digital twin execution module comprises a digital twin processing module adapted to update the operative data in real time upon creation of a state with respect to the at least one state machine model referenced the by at least one digital twin or upon change of configuration of the at least one state machine model as referenced by the at least one digital twin.

5. Controller service module according to claim 1, wherein the state machine execution module comprises a state machine execution controller adapted to check whether an input state triggers execution of a state transition activity in a state machine model or whether an input state represents an external state which is directly set in the state machine model.

6. Controller service module according to claim 1, wherein the state machine execution module comprises an event state setting module adapted to directly set an external state in a related state machine model.

7. Controller service module according to claim 6, wherein the event state setting module comprises an event state creator module adapted to create a state by
   allocating a state memory in the digital twin memory module according to a state scheme applicable to the external state;
   filling the allocated state memory with operative data as carried by the input state corresponding to the external state;
   invalidating the current state in the related state machine model; and
   validating the created state as current state of the related state machine model.

8. Controller service module according to claim 6, wherein the event state setting module comprises a context processing module adapted to update context references, wherein a context reference points from a digital twin to an applicable state transition activity and a related input template and wherein every input template models operational co-existence of predetermined states in one or more state machine models across the digital twin domain as trigger for execution of the state transition activity.

9. Controller service module according to claim 8, wherein the context processing module is adapted to cancel entries representing an invalidated current state in related input templates and adapted to enter entries representing a validated current state in related input templates.

10. Controller service module according to claim 1, wherein the state machine execution module comprises an activity execution module adapted to execute at least one state transition activity in relation to a state transition from a source state to a target state in at least one state machine model, wherein the state transition activity uses an input template that models a state context as operational co-existence of predetermined states in one or more state machine models across the digital twin domain as trigger for execution of the state transition activity.

11. Controller service module according to claim 10, wherein each state context forms a control flow triggering execution of a related state transition activity.

12. Controller service module according to claim 10, wherein the at least one state transition activity has a data template to form a data flow underlying the execution the at least one state transition activity and wherein the activity execution module is adapted to operate on data stored in the data template for transformation of data and for consideration of data-driven conditions during execution of the at least one state transition activity.

13. Controller service module according to claim 10, wherein the activity execution module comprises an activity memory module adapted to store state transition activities and a state flow processer adapted to process state transition activities as triggered by the control flow and/or the data flow.

14. Controller service module according to claim 13, wherein the activity memory module is adapted to store per state transition activity an activity operator and a state context store, wherein the state context store is adapted to store all input templates referenced by the state transmission activity due to parallel execution of the state transition activity for multiple digital twins.

15. Controller service module according to claim 13, wherein the state flow processor comprises
   an activity filtering module adapted to filter state transition activities of relevance for input states and adapted to filter input templates of filtered state transition activities being of relevance for input states;
   a context processing module adapted to update filtered input templates in at least one state context store of at last one state transition activity to reflect the input of input states and to instruct a validation of updated input templates with respect to completeness of coverage; and
   an activity processing module adapted to execute state transition activities with respect to successfully validated updated input templates.

16. Controller service module according to claim 15, wherein state contexts stored in state context stores are accessed by context references formed from pairs of activity references and input template references such that
   each activity reference points to a state transition activity,
   each input template reference points to an input template which is stored in a state context store of the state transition activity referenced by an activity reference paired with the input template reference;
   input states carry at least one context reference;
   the activity filtering module is adapted to filter state transition activities by comparing activity references of state transition activities with activity references carried by input states;
   the activity filtering module is adapted to filter input templates by comparing input template references assigned to input templates with input template references carried by input states and to validate updated input templates with respect to completeness of coverage.

17. Controller service module according to claim 15, wherein the activity processing module comprises an activity selector module adapted to select one state transition activity from a group of state transition activities as a function of conditional data in a data flow.

18. Controller service module according to claim 15, wherein the activity processing module comprises a control flow evaluation module adapted to evaluate whether a control flow as represented by an input template triggers an execution of a state transition.

19. Controller service module according to claim 15, wherein the activity processing module comprises a data flow evaluation module adapted to evaluate whether at least one condition as represented by a data flow triggers an execution of a state transition.

20. Controller service module according to claim 15, wherein the activity processing module comprises a data processing module adapted to execute an activity operator of a state transition activity upon trigger of the state transition activity, wherein execution of the activity operator transforms a source state into a target state optionally under operative conditions as specified in a related data flow.

21. Controller service module according to claim 20, wherein the data processing module is adapted to execute a data transformation of data in the data flow into state data for assignment to the target state.

22. Controller service module according to claim 20, wherein the data processing module is adapted to execute a control logic for generation of a control command according to the control logic for control of a process entity in the process domain.

23. Controller service module according to claim 22, wherein the control command is generated using persistent data available from the digital twin operating the data processing module and using event data describing process domain dynamics.

24. Controller service module according to claim 15, wherein the activity processing module comprises a state creator module adapted to create a target state according to a state scheme representing data elements in relation to the target state and according to data as processed by the data processing module.

25. Controller service module according to claim 24, wherein the state creator module is adapted to allocate state memory in the digital twin memory module according to the state scheme, to create at least one context reference for assignment to the target state and to store data in relation to the target state in the allocated state memory.

26. Controller service module according to claim 13, wherein the state flow processor comprises a context processing module adapted to update input templates stored in the state context store by cancelling entries representing invalidated states in related input templates and by entering entries representing validated states in related input templates.

27. Controller service module according to claim 1, wherein the inbound interface comprises an inbound process interface comprising
at least one communication endpoint adapted to terminate a communication channel established between a process entity and the inbound interface according to a predetermined communication protocol; and
at least one inbound processing line adapted to analyze payload data received at the communication endpoint and to transform relevant payload data into at least one input state for output to the inbound buffer.

28. Controller service module according to claim 27, wherein the at least one inbound processing line comprises a payload identification module adapted to identify payload data carried by communication data received at the communication endpoint;
a payload separation module adapted to separate payload data into at least one payload item to be forwarded to the digital twin domain;
a sender/receiver identification module adapted to identify a pair of process entity and digital twin object as sender and receiver of every payload item;
a signal forming module adapted to form a signal per payload item which represents information which is relevant for processing in digital twin domain;
a signal state mapping module adapted to map the signal onto an input state carrying the information represented by the signal and to execute a data transformation with respect to the payload item; and
an inbound communication port adapted to forward the input state to the inbound buffer.

29. Controller service module according to claim 27, wherein one inbound process interface is operated per pair of process entity and related input state for parallel asynchronous communication of event data from the process domain to the digital twin domain.

30. Controller service module according to claim 1, wherein the inbound interface comprises an inbound service interface adapted to read at least one messaging communication channel for receipt of state messages as generated by the model-based process controller of the controller service module or by a model-based process controller of at least one further controller service module operated in the digital twin domain.

31. Controller service module according to claim 30, wherein the inbound service interface is adapted to read at least one messaging communication channel setup for exchange of state messages carrying states having a dedicated state type.

32. Controller service module according to claim 30, wherein the inbound service interface comprises a state message reader adapted to read state messages exchanged on the at least one messaging communication channel and a state filter adapted to filter state messages to be processed by the controller service module.

33. Controller service module according to claim 1, wherein the inbound buffer comprises a process cycle line adapted to store input states and a state distributor adapted to check whether a type of a next input state is identical to a type of state stored in the process cycle line at an entry position and to update the process cycle line accordingly.

34. Controller service module according to claim 33, wherein the state distributor is adapted to overwrite the process cycle line at an entry position with a next input state when the type of the next input state and a type of an input state pre-stored at the entry position are identical.

35. Controller service module according to claim 33, wherein the process cycle line operates a line of state queues and wherein the state distributor is adapted to store a next input state in a next state queue when the type of the next input state is different form the types of all pre-stored input states.

36. Controller service module according to claim 1, wherein the outbound interface comprises a outbound process interface including
at least one outbound processing line adapted to receive an output state representing a control command and to transform relevant control information into at least one payload datum for output to a process entity in the process domain; and at least one outbound communication port adapted to output a communication signal which carries information being relevant for control of operation in the process domain.

37. Controller service module according to claim 36, wherein every outbound processing line comprises:
   a state signal mapping module adapted to map the output state onto a signal carrying the information represented by the output state and to execute a related data transformation;
   a payload identification module adapted to identify payload data carried by the signal carrying the information represented by the output state;
   a payload assembly module adapted to assemble the payload data into at least one payload item; and
   a communication signal forming module adapted to form a communication signal representing at least one payload item and related receiver for output to a communication end point.

38. Controller service module according to claim 36, wherein one outbound process interface is operated per pair of output state and related controlled process entity for parallel asynchronous communication of control commands from the digital twin domain to the process domain.

39. Controller service module according to claim 1, wherein the outbound interface comprises an outbound service interface adapted to write to at least one messaging communication channel for forwarding of state messages as generated in the model-based process controller.

40. Controller service module according to claim 39, wherein at least one messaging communication channels is provided per controller service module for exchange of state messages carrying state information having a dedicated state type.

41. Controller service system implementing an event-driven process control in a digital twin domain for control of process entities operated in a process domain, wherein in the digital twin domain the behavior of process entities is modeled through execution of state machine models referenced by digital twins, the controller service system comprising:
   at least one controller service modules according to claim 1, wherein each digital twin representing a process entity is assigned to exactly one controller service module for execution thereof;
   at least one messaging communication channel per controller service module for loosely coupling the at least one controller service module through exchange of state messages over the at least one messaging communication channel.

42. Computer service system according to claim 41, wherein one messaging communication channel is assigned to every computer service module of the least two control service modules such that every controller service module is adapted to output state messages to its assigned messaging communication channel and is adapted to read communication messages from message communication channels other than its assigned message communication channel.

43. Controller service system according to claim 41, wherein at least one messaging communication channel is provided per controller service module for exchange of state messages carrying state information having a dedicated state type.

44. Controller service system according to claim 41, wherein state messages carry event data as created in the process domain and as received by a controller service module.

45. Control method of running an event-driven control process in a digital twin domain for control of process entities operated in a process domain, wherein in the digital twin domain the behavior of process entities is modeled through execution of state machine models, the control method operating in processing cycles to continuously execute
   a step of asynchronously receiving event data created with respect to process entities in the process domain and/or event data created through execution of state machine models in the digital twin domain and of storing received event data in an inbound buffer;
   a step of distributing received event data from the inbound buffer to a process cycle buffer at the beginning of every process cycle, wherein every distributed event datum is represented in the process cycle buffer as an input state according to an instance of a state in a relevant state machine model that maps to the event datum;
   a step of executing a model-based control process for control of selected process entities by reading at least one input state from the process cycle buffer as stored for the processing cycle and of operating at least one relevant state machine model to reflect the input of at least one input state such that the state machine model can transit from at least one source state to at least one target state through execution of at least one state transition activity under the condition that a pre-determined state transition condition is met, wherein the state transition condition models a state context reflecting a co-existence of a pre-determined set of states in one or more state machine models across the digital domain during run time;
   a step of checking whether the operation of the at least one relevant state machine model triggers an external control operation in the process domain; and
   a step of generating an external control command to instruct the external control operation in the process domain and of outputting the generated external control command to at least one process entity processing the external control command when the operation of the at least one relevant state machine model triggers the external control operation.

46. Control method according to claim 45, comprising a step of processing at least one digital twin in a digital twin domain and in relation to at least one selected process entity, wherein the at least one digital twin embeds control logic for the at least one process entity, ingests operational data of the at least one selected process entity and references at least one state machine model to represent the behavior of the at least one selected process entity for observation and/or control thereof.

47. Control method according to claim 46, comprising a step of storing operative data for processing of the at least one digital twin in real time, wherein operative data is related to representation of the at least one digital twin, to representation of at least one state machine model as referenced by the at least one digital twin, and/or to representation of control logic embedded into the at least one digital twin.

48. Control method according to claim 46, comprising a step of updating the operative data in real time upon creation of a state with respect to the at least one state machine model referenced the by at least one digital twin or upon change of configuration of the at least one state machine model as referenced by the at least one digital twin.

49. Control method according to claim 45, wherein the step of executing the model-based control process comprises a step of checking whether an input state triggers execution of a state transition activity in a state machine model or whether an input state represents an external state which is directly set in the state machine model.

50. Control method according to claim 45, wherein the step of executing the model-based control process comprises a step of directly setting an external state in a related state machine model.

51. Control method according to claim 50, wherein the step of directly setting an external state in a related state machine model comprises
- a step of allocating a state memory in the digital twin memory module according to a state scheme applicable to the external state;
- a step of filling the allocated state memory with operative data as carried by the input state corresponding to the external state;
- a step of invalidating the current state in the related state machine model; and
- a step of validating the created state as current state of the related state machine model.

52. Control method according to claim 50, comprising a step of updating context references, wherein a context reference points from a digital twin to an applicable state transition activity and a related input template and wherein every input template models operational co-existence of predetermined states in one or more state machine models across the digital twin domain as trigger for execution of the state transition activity.

53. Control method according to claim 52, wherein step of updating context references cancels entries representing an invalidated current state in related input templates and enters entries representing a validated current state in related input templates.

54. Control method according to claim 45, wherein the step of operating a state machine model comprises a step of executing at least one state transition activity in relation to a state transition from a source state to a target state in the state machine model, wherein the state transition activity uses an input template that models a state context as operational co-existence of predetermined states in one or more state machine models across the digital twin domain as trigger for execution of the state transition activity.

55. Control method according to claim 54, wherein each state context forms a control flow triggering execution of a related state transition activity.

56. Control method according to claim 54, wherein the state transition activity has a data template that forms a data flow underlying the execution the state transition activity and wherein the step of executing the state transition activity operates on data stored in the data template for transformation of data and for consideration of data-driven conditions during execution of the state transition activity.

57. Control method according to claim 54, wherein the step of processing state transition activities is executed as soon as all entries of its input template are validated.

58. Control method according to claim 57, wherein the step of processing state transition activities comprises
- a step of filtering state transition activities of relevance for input states and of filtering input templates of filtered state transition activities being of relevance for input states;
- a step of updating filtered input templates in at least one state context store of at last one state transition activity to reflect the input of input states and to instruct a validation of updated input templates with respect to completeness of coverage; and
- a step of executing state transition activities with respect to successfully validated updated input templates.

59. Control method to claim 58, wherein state contexts stored in state context stores are accessed by context references formed from pairs of activity references and input template references such that
- each activity reference points to a state transition activity,
- each input template reference points to an input template which is stored in a state context store of the state transition activity referenced by an activity reference paired with the input template reference;
- input states carry at least one context reference; wherein
- the step of filtering state transition activities compares activity references of state transition activities with activity references carried by input states;
- the step of filtering input templates compares input template references assigned to input templates with input template references carried by input states.

60. Control method according to claim 57, wherein a step of processing state transition activities comprises a step of updating input templates stored in the state context store by cancelling entries representing invalidated states in input templates and by entering entries representing validated states in input templates.

61. Control method according to claim 54, comprising a of storing for every state transition activities an activity operator and a state context store, wherein the state context store is adapted to store all input templates referenced by the state transmission activity due to parallel execution of the state transition activity for multiple digital twins.

62. Control method according to claim 54, wherein the step of executing state transition activities comprises a step of selecting one state transition activity from a group of state transition activities as a function of conditional data in a data flow.

63. Control method according to claim 54, wherein the step of executing state transition activities comprises a step of evaluating whether a control flow as represented by an input template triggers an execution of a state transition.

64. Control method according to claim 54, wherein the step of executing state transition activities comprises a step of evaluating whether at least one condition as represented by a data flow triggers an execution of a state transition.

65. Control method according to claim 54, wherein the step of executing state transition activities comprises a step of executing an activity operator of a state transition activity upon trigger of the state transition activity, wherein execution of the activity operator transforms a source state into a target state optionally under operative conditions as specified in a related data flow.

66. Control method according to claim 65, wherein the step of executing an activity operator executes a data transformation to generate state data for assignment to the target state.

67. Control method according to claim 54, wherein the step of executing state transition activities comprises a step of creating a target state according to a state scheme representing data elements in relation to the target state and according to data as processed by a related activity operator.

68. Control method according to claim 67, wherein the step of creating a target state allocates state memory in the digital twin memory module according to the state scheme, creates at least one context reference for assignment to the target state and stores data in relation to the target state in the allocated state memory.

69. Control method according to claim 45, wherein the step of executing an activity operator executes a control logic for generation of a control command according to the control logic for control of a process entity in the process domain.

70. Control method according to claim 69, wherein the control command is generated using persistent data available from the digital twin operating the data processing module and using event data describing process domain dynamics.

71. Control method according to claim 45, wherein the step of asynchronously receiving event data created with respect to process entities in the process domain comprises
- a step of operating at least one communication endpoint adapted for termination of a communication channel established from a process entity according to a pre-determined communication protocol; and
- a step of operating at least one inbound processing line for analyzing payload data received at the communication endpoint and for transforming relevant payload data into at least one input state for output to the inbound buffer.

72. Control method according to claim 71, wherein the step of operating at least one inbound processing line comprises:
- a step of identifying payload data carried by communication data received at the communication endpoint;
- a step of separating payload data into at least one payload item to be forwarded to the digital twin domain;
- a step of identifying a pair of process entity and digital twin object as sender and receiver of every payload item;
- a step of forming a signal per payload item which represents information which is relevant for processing in digital twin domain;
- a step of mapping the signal onto an input state carrying the information represented by the signal;
- a step of executing a data transformation with respect to the payload item; and
- a step of forwarding the input state to the inbound buffer.

73. Control method according to claim 71, wherein the step of operating an inbound process interface is executed per pair of process entity and related input state for parallel asynchronous communication of event data from the process domain to the digital twin domain.

74. Control method according to claim 45, wherein the step of asynchronously receiving event data created through execution of state machine models in the digital twin domain comprises a step of reading at least one messaging communication channel for receipt of state messages.

75. Control method according to claim 74, wherein at least one messaging communication channels is provided for exchange of state messages setup for exchange of state messages carrying states having a dedicated state type.

76. Control method according to claim 74, wherein step of reading at least one messaging communication channel for receipt of state messages comprises a step of reading state messages exchanged on the at least one messaging communication channel and a step of filtering state messages to be processed by the control method.

77. Control method according to claim 45, comprising a step of storing input states in a process cycle line of the inbound buffer, wherein a step of distributing checks whether a type of a next input state is identical to a type of state stored in the process cycle line at an entry position and the step of storing input states updates the process cycle line accordingly.

78. Control method according to claim 77, wherein the step of storing input states overwrites the process cycle line at an entry position with a next input state when the type of the next input state and a type of an input state pre-stored at the entry position are identical.

79. Control method according to claim 77, wherein the process cycle line operates a line of state queues and wherein the step of storing input states stores a next input state in a next state queue when the type of the next input state is different form the types of all pre-stored input states.

80. Control method according to claim 45, wherein an outbound process interface is operated by
- a step of operating at least one outbound processing line for receipt of an output state representing a control command and to transform relevant control information into at least one payload datum for output to a process entity in the process domain; and
- a step of operating an outbound communication port adapted to output a communication signal carrying information being relevant for control of operation in the process domain.

81. Control method according to claim 80, wherein the step of operating at least one outbound processing line every outbound processing line comprises
- a step of mapping output state onto a signal carrying the information represented by the output state and to execute a related data transformation;
- a step of identifying payload data carried by the signal carrying the information represented by the output state;
- a step of assembling the payload data into at least one payload item; and
- a step of forming a communication signal representing at least one payload item and of forwarding the communication signal to a communication end point.

82. Control method according to claim 80, wherein one outbound process is operated per pair of output state and related controlled process entity for parallel asynchronous communication of control commands from the digital twin domain to the process domain.

83. Control method according to claim 45, comprising a step of operating an outbound service interface to write state messages to at least one messaging communication channel.

84. Control method according to claim 83, wherein the step of operating an outbound service interface operates at least one messaging communication channel per controller service module for exchange of state messages carrying state information having a dedicated state type.

85. Method of operating a controller service system implementing an event-driven process control in a digital twin domain for control of process entities operated in a process domain, wherein the controller service system comprises at least one controller service module according to claim 1 and wherein in the digital twin domain the behavior of process entities is modeled through execution of state machine models referenced by digital twins, the method comprising
- a step of assigning an operation of a digital twin representing a process entity to exactly one controller service module for execution thereof;
- a step of operating the at least one controller service module for implementation of the even-driven process control of process entities while loosely coupling the at least one controller service module through exchange of state messages over at least one messaging communication channel.

86. Method of operating a computer service system according to claim 85, wherein one messaging communication channel is assigned to every computer service module of the least two control service modules, wherein every controller service module executes a step of outputting state messages to its assigned messaging communication channel and a step of reading state messages from message communication channels other than its assigned message communication channel.

87. Method of operating a computer service system according to claim 85, wherein at least two messaging communication channels are provided per controller service module for exchange of state messages carrying state information having a dedicated state type.

88. Method of operating a computer service system according to claim 85, wherein state messages carry event data as created in the process domain and as received by a controller service module.

\* \* \* \* \*